US012483577B2

United States Patent
Bajpai

(10) Patent No.: US 12,483,577 B2
(45) Date of Patent: Nov. 25, 2025

(54) CYBERSECURITY ON A CONTROLLER AREA NETWORK IN A VEHICLE

(71) Applicant: SECURETHINGS U.S., INC., Los Altos, CA (US)

(72) Inventor: Vishal Bajpai, Los Altos, CA (US)

(73) Assignee: Securethings U.S., Inc., Los Altos, CA (US)

( * ) Notice: Subject to any disclaimer, the term of this patent is extended or adjusted under 35 U.S.C. 154(b) by 0 days.

(21) Appl. No.: 18/635,548

(22) Filed: Apr. 15, 2024

(65) Prior Publication Data
US 2024/0406200 A1    Dec. 5, 2024

Related U.S. Application Data

(63) Continuation of application No. 17/058,907, filed as application No. PCT/US2019/034053 on May 24, 2019, now Pat. No. 11,985,150.
(Continued)

(51) Int. Cl.
| | |
|---|---|
| *H04L 9/40* | (2022.01) |
| *H04L 12/40* | (2006.01) |
| *H04W 4/44* | (2018.01) |

(52) U.S. Cl.
CPC .... *H04L 63/1425* (2013.01); *H04L 12/40013* (2013.01); *H04L 63/0428* (2013.01);
(Continued)

(58) Field of Classification Search
CPC ........... H04L 63/1425; H04L 12/40013; H04L 63/0428; H04L 63/1441;
(Continued)

(56) References Cited

U.S. PATENT DOCUMENTS

| | | | |
|---|---|---|---|
| 11,628,784 B2 * | 4/2023 | Ben Noon | G06F 11/30 340/426.1 |
| 2005/0251604 A1 | 11/2005 | Gerig | |

(Continued)

FOREIGN PATENT DOCUMENTS

WO    2017042012 A1    3/2017

OTHER PUBLICATIONS

Invitation to Pay Additional Fees And, Where Applicable, Protest Fee, dated Jul. 11, 2019 for related International Application No. PCT/US2019/034053, in 2 pages.
(Continued)

*Primary Examiner* — Abiy Getachew
(74) *Attorney, Agent, or Firm* — Procopio, Cory, Hargreaves & Savitch LLP

(57) ABSTRACT

Cybersecurity on a Controller Area Network (CAN) in a vehicle. In an embodiment, electronic control units (ECUs), connected to a CAN bus, each comprise a hacking detection system, which, during an initialization stage, transmits a message comprising a CAN identifier, used by the respective ECU, to at least one other hacking detection system, receives a message comprising a CAN identifier, used by at least one other ECU, from the other hacking detection system, monitors one or more parameters, including at least one parameter of CAN messages received by the respective ECU and transmitted by the respective ECU, and generates a pattern-detection mechanism based on the monitored one or more parameters. Then, during a detection stage, each hacking detection system monitors the one or more parameters, and detects malicious activity based on the generated pattern-detection mechanism and the one or more parameters monitored during the detection stage.

20 Claims, 9 Drawing Sheets

Related U.S. Application Data

(60) Provisional application No. 62/755,923, filed on Nov. 5, 2018, provisional application No. 62/676,879, filed on May 25, 2018, provisional application No. 62/676,877, filed on May 25, 2018, provisional application No. 62/676,874, filed on May 25, 2018.

(52) U.S. Cl.
CPC .......... *H04L 63/1441* (2013.01); *H04W 4/44* (2018.02); *H04L 2012/40215* (2013.01); *H04L 2012/40273* (2013.01)

(58) Field of Classification Search
CPC . H04L 2012/40215; H04L 2012/40273; H04L 63/0435; H04L 63/1408; H04L 67/12; H04L 67/34; H04L 69/40; H04W 4/44; H04W 4/50; G06F 21/55; G06F 21/577; G06F 21/85
See application file for complete search history.

(56) References Cited

U.S. PATENT DOCUMENTS

| | | | |
|---|---|---|---|
| 2013/0104231 A1* | 4/2013 | Niner ................. | H04L 63/1416 726/23 |
| 2014/0215055 A1 | 7/2014 | Reynolds et al. | |
| 2015/0020152 A1* | 1/2015 | Litichever ............... | H04L 63/14 726/1 |
| 2015/0113638 A1* | 4/2015 | Valasek ................. | G06F 21/562 726/22 |
| 2015/0271201 A1* | 9/2015 | Ruvio ..................... | H04L 67/12 726/23 |
| 2017/0063996 A1 | 3/2017 | Kaster | |
| 2017/0126711 A1 | 5/2017 | Jung et al. | |
| 2017/0200323 A1 | 7/2017 | Allouche et al. | |
| 2017/0270295 A1 | 9/2017 | Park et al. | |
| 2018/0012019 A1 | 1/2018 | Harris et al. | |
| 2018/0115575 A1 | 4/2018 | Hartkopp et al. | |

OTHER PUBLICATIONS

International Search Report and Written Opinion, dated Oct. 3, 2019 for related International Application No. PCT/US2019/034053, in 20 pages.

Extended European Search Report Issued in European Application No. 19808519.3, dated Jan. 27, 2022, 10 pages.

* cited by examiner

CYBERSECURITY ON A CONTROLLER AREA NETWORK IN A VEHICLE

CROSS-REFERENCE TO RELATED APPLICATIONS

This application is a continuation of U.S. patent application Ser. No. 17/058,907, filed on Nov. 25, 2020, which is a national stage entry of International Patent Application No. PCT/US2019/034053, filed on May 24, 2019, which claims priority to U.S. Provisional Patent App. No. 62/676,874, filed on May 25, 2018, U.S. Provisional Patent App. No. 62/676,877, filed on May 25, 2018, U.S. Provisional Patent App. No. 62/676,879, filed on May 25, 2018, and U.S. Provisional Patent App. No. 62/755,923, filed on Nov. 5, 2018, which are all hereby incorporated herein by reference as if set forth in full.

BACKGROUND

Field of the Invention

The embodiments described herein are generally directed to cybersecurity within a vehicle, and, more particularly, to hacking mitigation on the Controller Area Network (CAN) within a vehicle.

Description of the Related Art

Typically, in a vehicle's internal communication network, a plurality of electronic control units (ECUs) communicate with each other using the CAN standard. An ECU is any embedded system in the vehicle's electronics that controls one or more electrical systems or subsystems within the vehicle. Each ECU may be responsible for a different function within the vehicle, such as body control, powertrain, transmission, heating, ventilation, and air conditioning (HVAC), telematics, infotainment, and/or the like. For example, common types of ECUs include an engine control module (ECM), powertrain control module (PCM), transmission control module (TCM), brake control module (BCM or EBCM), and the like. Although seventy to eighty ECUs is more common, some modern automobiles have as many as one-hundred fifty ECUs.

The CAN standard is a message-based protocol that is designed to allow microcontrollers and other devices to communicate with each other, without the need of a host computer, using a multi-master serial bus that communicatively connects the ECUs (also referred to as "nodes"). Each ECU is able to send and receive messages using the CAN bus, but the messages are transmitted serially. CAN communication relies on frames, and uses a lossless bitwise arbitration method for contention resolution, in which each CAN frame's transmission priority is decided by an arbitration field within the CAN frame. Specifically, each CAN frame comprises a CAN identifier (also known as an "arbitration identifier"), which represents the priority of the CAN frame. Each ECU may utilize a set of one or multiple CAN identifiers for in its transmitted CAN frames, but generally no two ECUs will utilize the same CAN identifier. If two ECUs begin transmitting on the CAN bus at the same time, the ECU with the lower CAN identifier (i.e., higher priority) will "win," while the ECU with the higher CAN identifier (i.e., lower priority) will stop transmitting and wait for a predetermined time before attempting to transmit its CAN frame again. In addition to the CAN identifier, each CAN frame comprises the data length, payload, cyclic redundancy check (CRC), acknowledgement (ACK) bits, and other overhead fields.

After the CRC field of the CAN frame is received, each receiving ECU performs error checking on the CAN frame using the payload and CRC fields. Each receiving ECU will set an ACK bit (i.e., the ACK bit will be set dominant) in the CAN frame when no error is detected during the error-checking process, and will not set the ACK bit (i.e., the ACK bit will remain recessive) in the CAN frame when an error is detected during the error-checking process. The transmitting ECU, which is reading the CAN bus as it transmits an unset ACK bit in the CAN frame, will know if any ECU simultaneously sets the ACK bit in the CAN frame. If at least one ECU sets the ACK bit in the CAN frame, the transmitting ECU will assume that the CAN frame was successfully transmitted (e.g., even if not every ECU successfully received the CAN frame). Otherwise, if no ECUs set the ACK bit in the CAN frame, the ACK bit will remain unset when read by the transmitting ECU. This will cause the transmitting ECU to retransmit the CAN frame.

Based on the ACK bit alone, if at least one receiving ECU did not detect an error and, therefore, set the ACK bit, the transmitting ECU would not know if one of the receiving ECUs detected an error. Thus, a receiving ECU that detects an error will immediately send an error frame after an ACK delimiter field following the ACK bit. Upon receiving the error frame, the transmitting ECU will retransmit the CAN frame.

Technically, a CAN message may span one or more CAN frames. However, for purposes of simplicity, the term "CAN message" will be used herein to refer to both a single CAN frame and a CAN message spanning a plurality of CAN frames. Notably, there are different types of CAN messages. Fixed-periodic CAN messages are transmitted by their respective ECUs in a cyclic or periodic manner. The cycle time may differ depending on the particular type of fixed-periodic CAN message. Event-periodic CAN messages are transmitted by their respective ECUs upon the occurrence of some triggering event. In addition, an enabled-periodic CAN message is transmitted for a certain number of cycles or periods upon the occurrence of some triggering event. Again, the cycle time may differ depending on the particular type of enabled-periodic CAN message.

This message-based CAN of ECUs is vulnerable to attack. For example, a hacker may obtain access to the CAN of a vehicle by exploiting a weakness in Wi-Fi™ technology, Bluetooth™ technology, cellular technology, other radio technology, a user's credentials, vehicle-installed apps (e.g., which utilize external communications with an external network), and/or the like. The hacker could also obtain physical access to the vehicle, for example, through the onboard diagnostics (OBD) port (e.g., OBD II port). As another example, a hacker with physical access to the vehicle (e.g., a malicious service technician) may compromise the vehicle by either replacing an ECU in the vehicle with a malicious ECU or removing security software installed on an ECU.

Once the hacker has access to the CAN, the hacker may inject malicious messages onto the CAN bus. The injection of these malicious messages may enable the hacker to manipulate the vehicle's functionality, including, for example, the vehicle's engine, steering system, safety systems, and/or braking system. Thus, it should be apparent that these malicious messages have the potential to result in vehicle theft, vehicle collisions, and even human fatalities.

As an example, a hacker may deploy malware on an ECU that causes the compromised ECU to constantly transmit error frames on the CAN bus, thereby triggering transmitting ECUs to constantly retransmit their CAN messages and flood the CAN bus with messages. The constant retransmissions may also trigger transmitting ECUs to transition to their bus-off states (e.g., when transmit and/or receive errors surpass a predefined threshold). The bus-off state is part of the CAN error confinement mechanism. In the bus-off state, an ECU will not transmit anything to the CAN bus. In addition, when an ECU transitions to the bus-off state, the hacker or malware may impersonate that ECU to transmit malicious messages on its behalf. Unfortunately, the CAN standard does not currently provide a mechanism for identifying whether or not a message on the CAN bus is originating from a legitimate source or a compromised ECU or hacker. As additional examples, a hacker could install malware or modify another resource in the vehicle, other than an ECU, and/or maliciously access and/or modify memory (e.g., in-memory buffers) in ECUs or other devices, to attack the vehicle.

As yet another example, a hacker could deploy a wireless hacking device at a fixed geographical location (e.g., along a freeway, at a traffic light, etc.) that continually probes vehicles passing within its range. Such a hacking device could be used to inject malware into the vehicle (e.g., using whatever wireless technology is available on the vehicle) as the vehicle passes within the hacking device's wireless communication range. For example, ECUs within a vehicle are generally required to update their firmware from time-to-time, to apply patches (e.g., to fix vulnerabilities) or enable or add features. This is of particular importance for autonomous vehicles. However, firmware updates by vehicle recall to a service station are both time consuming and costly. As a result, firmware-over-the-air (FOTA) has become an increasingly popular alternative to the traditional recall process for updating firmware. Unfortunately, FOTA comes with the risk that a hacker could compromise the firmware-update channel and inject malware, posing as a firmware update, into the ECUs (e.g., using deployed hacking devices).

In view of the above, what is needed are hacking detection and/or mitigation mechanisms for vehicle ECUs.

SUMMARY

Accordingly, systems, methods, and non-transitory computer-readable media are disclosed for detecting and/or mitigating hacking of ECUs within a vehicle.

In an embodiment, a system is disclosed that comprises: a plurality of electronic control units (ECUs), wherein each of the plurality of ECUs is communicatively connected to a Controller Area Network (CAN) bus within a vehicle, and wherein each of the plurality of ECUs comprises at least one hardware processor and a hacking-detection software module that is configured to, when executed by the at least one hardware processor of the respective ECU, during an initialization stage, in accordance with a message protocol, transmit a message comprising a CAN identifier, used by the respective ECU, to at least one other hacking-detection software module on another one of the plurality of ECUs, in accordance with the message protocol, receive a message comprising a CAN identifier, used by the at least one other ECU, from the other hacking-detection software module, monitor one or more parameters, including at least one parameter of CAN messages received by the respective ECU and transmitted by the respective ECU, according to a CAN bus protocol, on the CAN bus, and generate a pattern-detection mechanism based on the monitored one or more parameters, and during a detection stage, monitor the one or more parameters, and detect malicious activity based on the generated pattern-detection mechanism and the one or more parameters monitored during the detection stage. The message protocol may be implemented at an abstraction layer above the CAN bus protocol.

The hacking-detection software modules may be further configured to, during the initialization stage, join at least one peer-to-peer sub-network with one or more other hacking-detection software modules. The at least one peer-to-peer sub-network may be associated with a security policy, and wherein each hacking-detection software module that has joined the at least one peer-to-peer sub-network operates in accordance with the associated security policy. At least a first one of the hacking-detection software modules may join a first peer-to-peer sub-network that is associated with a first security policy, at least a second one of the hacking-detection software modules may join a second peer-to-peer sub-network that is different than the first peer-to-peer sub-network and is associated with a second security policy that is different than the first security policy, and the first hacking-detection software module may operate in accordance with the first security policy, and the second hacking-detection software module may operate in accordance with the second security policy. The security policy may require encrypted communications, wherein, in accordance with this security policy, each hacking-detection software module that has joined the at least one peer-to-peer sub-network encrypts CAN messages transmitted by its respective ECU.

Generating a pattern-detection mechanism may comprise identifying a cycle in the CAN messages received from the at least one other ECU, wherein detecting malicious activity comprises: determining that the at least one other ECU has transitioned to a bus-off state based on a disruption in the identified cycle; and, when receiving a CAN message comprising the CAN identifier, used by the at least one other ECU, after determining that the at least one other ECU has transitioned to the bus-off state, determining that the received CAN message represents an impersonation attack.

At least one hacking-detection software module may be further configured to, when executed by the at least one hardware processor of the respective ECU, during the initialization stage, monitor at least one parameter of external messages, received by the respective ECU from any external endpoint and transmitted by the respective ECU to any external endpoint, via an external-communications interface, wherein the one or more parameters further comprise the at least one parameter of external messages.

At least one hacking-detection software module may be further configured to, when executed by the at least one hardware processor of the respective ECU, monitor at least one external condition that is external to the CAN, wherein the one or more parameters further comprise the at least one external condition. The at least one external condition may be external to the vehicle. The at least one external condition may be a weather or road condition.

At least one hacking-detection software module may be further configured to, when executed by the at least one hardware processor of the respective ECU, monitor at least one sensor value, wherein the one or more parameters further comprise the at least one sensor value.

At least one hacking-detection software module may be further configured to, when executed by the at least one hardware processor of the respective ECU, monitor a usage of at least one resource within the respective ECU, wherein the one or more parameters comprise the usage of the at least one resource. The at least one resource may be one or both of the at least one hardware processor in the respective ECU, a memory in the respective ECU, and a network to which the respective ECU is communicatively connected.

The pattern-detection mechanism may comprise one or more rules that are applied to the one or more parameters monitored during the detection stage. The pattern-detection mechanism may comprise a machine-learning algorithm, which has been trained by the one or more parameters monitored during the initialization stage, and which is applied to the one or more parameters monitored during the detection stage.

Each hacking-detection software module may be further configured to, when executed by the at least one hardware processor of the respective ECU: store each of a plurality of identifiers, from messages that were received in accordance with the message protocol during the initialization stage, such that the stored plurality of identifiers identify ECUs that comprise hacking-detection software module; before each transmission of a CAN message by the respective ECU, when all intended recipients of the CAN message to be transmitted are identified in the stored plurality of identifiers, encrypt the CAN message to be transmitted prior to transmission, and when at least one intended recipient of the CAN message to be transmitted is not identified in the stored plurality of identifiers, do not encrypt the CAN message to be transmitted prior to transmission; and, after reception of a CAN message by the respective ECU, when a transmitter of the received CAN message is identified in the stored plurality of identifiers, decrypt the received CAN message prior to processing by the respective ECU, and, when the transmitter of the received CAN message is not identified in the stored plurality of identifiers, do not decrypt the received CAN message prior to processing by the respective ECU.

Each hacking-detection software module may be further configured to, when executed by the at least one hardware processor of the respective ECU, during the detection stage, when malicious activity is detected, respond to the malicious activity. Responding to the malicious activity may comprise prohibiting an operation, discarding a message, and/or initiating an alert to a user of the vehicle. The alert may comprise one or more of a visual alert, an audio alert, and a haptic alert. Responding to the malicious activity may comprise, when the malicious activity comprises a proximity-based attack, transmitting a geographic location of the vehicle that corresponds to a time at which the proximity-based attack was detected, to an external server, over an external network, via an external-communications interface.

One of the plurality of ECUs may control an engine of the vehicle, wherein the hacking-detection software module of this one ECU is configured to, when executed by the at least one hardware processor of this one ECU, in response to an ignition request, determine whether or not to start the engine based on an immobilization flag that is set by a remote server that is communicatively connected to the one ECU by at least one external network.

Each hacking-detection software module may be further configured to, when executed by the at least one hardware processor of the respective ECU, during the initialization stage, determine a number of ECUs that listen to the CAN identifier used by the respective ECU, wherein the one or more parameters further comprise the number of ECUs. Each hacking-detection software module may be further configured to, when executed by the at least one hardware processor of the respective ECU, during the detection stage, after transmitting a CAN message on the CAN bus: count a number of acknowledgement messages received in response to the transmitted CAN message; compare the number of acknowledgement messages to the number of ECUs that listen to the CAN identifier used by the respective ECU; and, when the number of acknowledgement messages is greater than the number of ECUs that listen to the CAN identifier used by the respective ECU, detect malicious activity, and respond to the malicious activity. Responding to the malicious activity may comprise prohibiting the respective ECU from retransmitting the transmitted CAN message.

In an embodiment, a method is disclosed that comprises using at least one hardware processor to: from each of one or more vehicles, receive a location of a proximity-based attack to at least one electronic control unit (ECU) of the vehicle; store each received location of a proximity-based attack in a memory; receive a navigation request from at least one user device over at least one network, wherein the navigation request identifies an starting location and a destination location; and, in response to the navigation request, identify at least one vehicular route between the starting location and the destination location that minimizes a risk of proximity-based attack based on the stored locations of proximity-based attacks, and transmit a representation of the at least one vehicular route to the at least one user device over the at least one network. Identifying the at least one route may comprise: generating a plurality of routes between the starting location and the destination location; for each of the plurality of routes, generating a score based on the stored locations of proximity-based attacks that coincide with the route and one or both of a distance and estimated time of the route; and identifying one of the plurality of routes with a most favorable score.

In an embodiment, a method is disclosed that comprises using at least one hardware processor of a target system to: over at least one network, receive a firmware-update message from a server node within a firmware-over-the-air (FOTA) network comprising a plurality of server nodes; in response to the firmware update message, initiate a firmware-update process comprising, for each of a plurality of blocks that collectively represent a firmware update, over the at least one network, downloading the block and metadata for the block from at least one of the plurality of server nodes, wherein each pair of consecutive blocks is downloaded from different ones of the plurality of server nodes; after all of the plurality of blocks have been downloaded, verify that the firmware update has been successfully downloaded; when the firmware update is verified, install the firmware update; and, when the firmware update is not verified, re-initiate at least a portion of the firmware-update process.

For each of the plurality of blocks, downloading the block and metadata for the block from at least one of the plurality of server nodes may comprise downloading the block from a first one of the plurality of server nodes, and downloading the metadata for the block from a second one of the plurality of server nodes that is different than the first server node. Each of the plurality of blocks may be encrypted, and the metadata for each block may comprise a digital key for decrypting the block. During the firmware-update process, each of the plurality of blocks may be downloaded from a different one of the plurality of server nodes than all of the other plurality of blocks. Verifying that the firmware update has been successfully downloaded may comprise, over the at least one network: transmitting a request for verification to one of the plurality of server nodes; and receiving a response from the one server node that indicates whether or not the firmware update has been verified.

In an embodiment, a firmware-over-the-air (FOTA) system is disclosed that comprises: a plurality of server nodes arranged in a network, wherein each of the plurality of server nodes comprises one or more software modules configured to, when executed by a hardware processor, store a plurality of blocks that collectively represent a firmware update, over at least one network, receive a request from a target system to transmit one of the plurality of blocks, and, in response to the request, transmit the one block to the target system over the at least one network; wherein at least one of the plurality of server nodes comprises one or more software modules that are configured to, when executed by a hardware processor, transmit an update message to a target system, over the at least one network, to initiate a firmware-update process at that target system; and wherein at least one of the plurality of server nodes comprises one or more software modules that are configured to, when executed by a hardware processor, receive a verification request to verify a firmware update at a target system, and, in response to the verification request, retrieve a retrieval history stored for the requesting target system, wherein the retrieval history comprises information about each download of one of the plurality of blocks by the requesting target system, determine whether or not to verify the firmware update at the requesting target system based on the retrieval history, and transmit a verification response to the requesting target system, wherein the verification response indicates whether or not the firmware update at the requesting target system has been verified.

In an embodiment, a method is disclosed that comprises using at least one hardware processor of a reporting device within a vehicle to: communicate with a license server, over at least one network, to activate a license associated with a hacking-detection system on at least one electronic control unit (ECU) within the vehicle, wherein the hacking-detection system is configured to detect malicious activity at the ECU; and, subsequently, each time that the ECU is booted, determine whether or not the license remains valid, and, when the license is determined to be invalid, deactivate the hacking-detection system; and, in response to at least one event, transmit usage data to the license server. The at least one event may comprise starting the vehicle, turning off the vehicle, and/or the expiration of a time interval while the vehicle is operating. The usage data may comprise one or more of a mileage of the vehicle, a running time of the vehicle, a running time of the hacking-detection system, and an up time of the hacking-detection system.

Any of the methods described above and herein may be embodied in executable software modules of a processor-based system (e.g., ECU, FOTA server, etc.) and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for detecting and/or mitigating hacking of ECUs within a vehicle. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview
1.1 Infrastructure

Figure 1A:
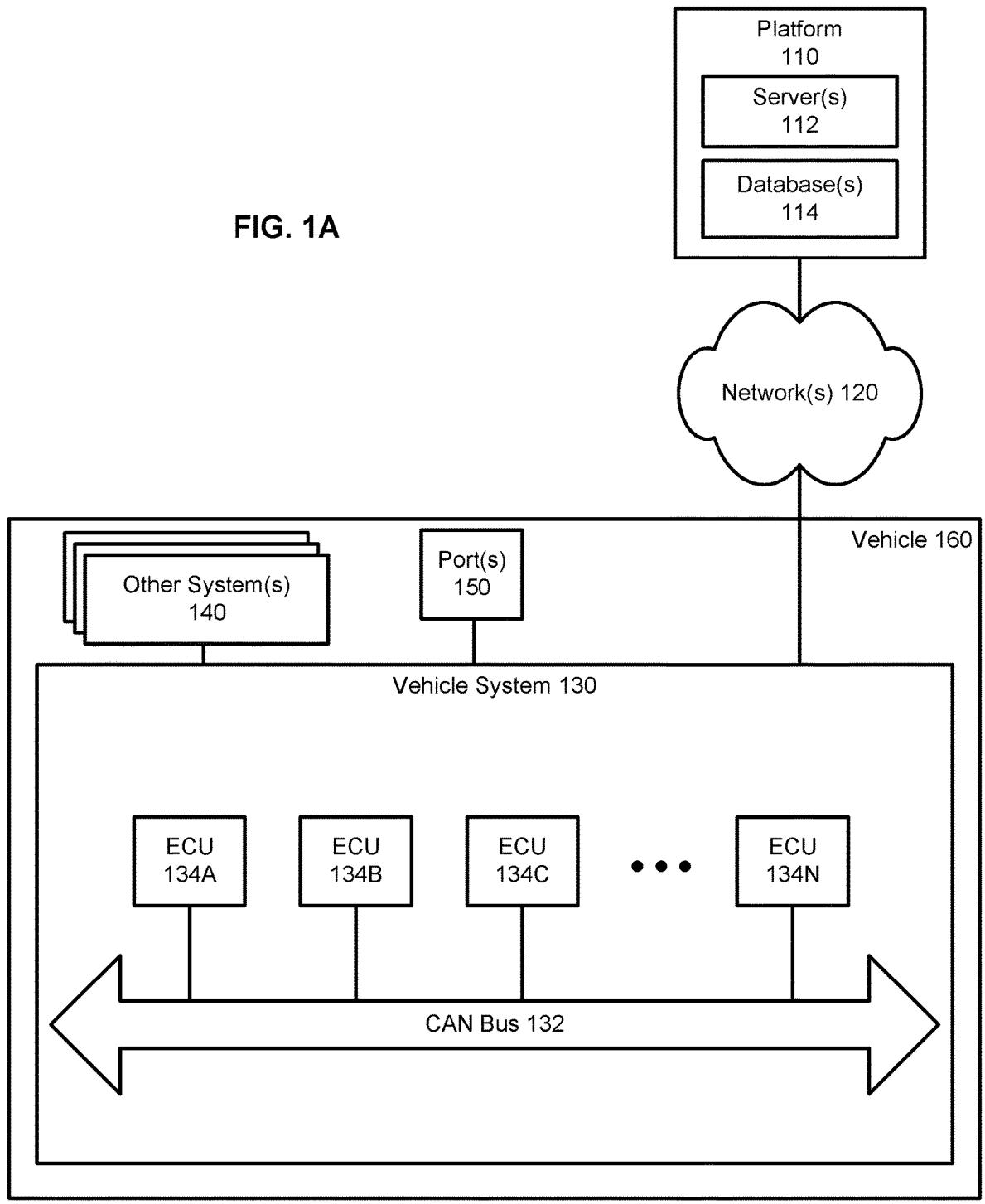
FIG. 1A illustrates an example infrastructure, in which one or more of the processes described herein, may be implemented, according to an embodiment.

FIG. 1A illustrates an example infrastructure in which one or more of the processes described herein may operate, according to an embodiment. The infrastructure may comprise a platform 110 which hosts and/or executes one or more of the various server-related functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to one or more server applications 112 (referred to herein simply as a "server") and/or one or more databases 114. In addition, platform 110 may be communicatively connected to one or more vehicle systems 130 of one or more vehicles 160 via one or more networks 120.

Network(s) 120 may comprise the Internet, and platform 110 (e.g., server(s) 112) may communicate with vehicle system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While only one vehicle system 130 and vehicle 160, one port 150, a few other system(s) 140, one set of server(s) 112, and one set of database(s) 114 are illustrated, it should be understood that the infrastructure may comprise any number of vehicle systems 130, vehicles 160, ports 150, other systems 140, servers 112, and databases 114. In addition, platform 110 may be connected to different vehicle systems 130 via different sets of network(s) 120.

Generally, vehicle system 130 is comprised within a vehicle 160. Vehicle 160 may be of any type, including, without limitation, an automobile, motorcycle, airplane, and the like. In addition, vehicle system 130 may communicate with network(s) 120 wirelessly (e.g., via cellular, Wi-Fi™, and/or Bluetooth™ technology) and/or via a wired connection, and may communicate directly (e.g., via an integral network interface) or indirectly (e.g., via an external-network interface installed within vehicle 160). Each vehicle system 130 may comprise a plurality of ECUs 134 connected to a CAN bus 132, and be communicatively connected to one or more other systems 140 and/or one or more ports 150. At least one ECU 134 may comprise a gateway to CAN bus 132, which provides communication between CAN bus 132 and an external system (e.g., network(s) 120, other system(s) 140, personal computer connected via port 150, etc.). ECUs 134 may be connected to CAN bus 132 directly (e.g., via a wired connection) or indirectly via a wireless connection to a gateway (e.g., another ECU 134, a hacking detection system 170, etc.) that is connected to CAN bus 132.

Other system(s) 140 may comprise an engine control system, a transmission control system, a battery system, a cruise control system, a vehicle steering system (e.g., electric power steering system), a vehicle braking system (e.g., antilock braking system (ABS)), a vehicle instrument cluster and/or dashboard, a vehicle heads-up-display (HUD) (e.g., installed on or within the vehicle's windshield), a Global Positioning System (GPS) installed within the vehicle, an audio system, a power window system, an airbag system, a power adjustment system (e.g., for adjusting side-view mirrors, a rearview mirror, power seats, etc.), a recharging system for hybrid or electric vehicles, and/or the like. Other system(s) 140 may be controlled by one or more ECUs 134 in vehicle system 130. Port(s) 150 may comprise an OBD II port and/or the like. An OBD II port can enable external devices to be connected to CAN bus 132.

Platform 110 may comprise, be communicatively coupled with, or otherwise have access to one or more database(s) 114. For example, platform 110 may comprise one or more database servers which manage one or more databases 114. A vehicle system 130 or a server 112 executing on platform 110 may submit data to be stored in database(s) 114, and/or retrieve data stored in database(s) 114. Any suitable database may be utilized, including without limitation MySQL™, Oracle™, IBM™, Microsoft SQL™, Access™, and the like, including cloud-based databases and proprietary databases. In an embodiment, server(s) 112 may comprise a navigation server for identifying vehicular routes, a license server for licensing the hacking detection system disclosed herein, and/or a FOTA network of update nodes for updating firmware on ECUs 134.

In embodiments in which a web service is provided (e.g., by server(s) 112), platform 110 may receive requests from vehicle system(s) 130, and provide responses in extensible Markup Language (XML), JavaScript Object Notation (JSON), and/or any other suitable or desired format. In such embodiments, platform 110 may provide an application programming interface (API) which defines the manner in which vehicle system(s) 130 may interact with the web service.

1.2. Example ECU

Figure 1B:
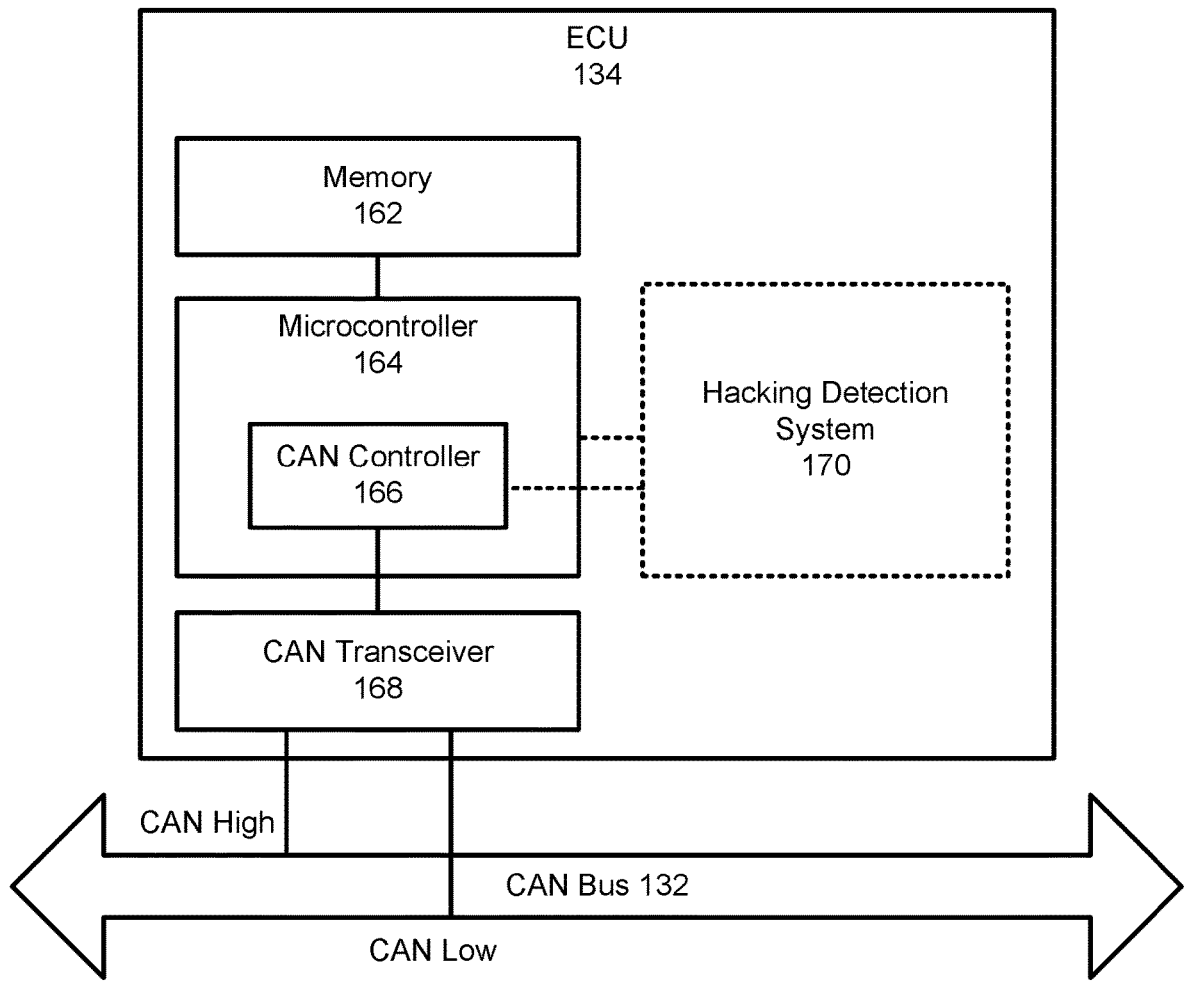
FIG. 1B illustrates an example ECU, according to an embodiment.

FIG. 1B illustrates an example ECU 134, according to an embodiment. As shown, ECU 134 may comprise onboard memory 162, a microcontroller 164, a CAN controller 166, and a CAN transceiver 168. The onboard memory may include non-volatile memory and/or volatile memory, and may comprise flash memory (e.g., in the form of a solid-state drive). CAN controller 166 controls the transmission and reception of messages from CAN bus 132 via CAN transceiver 168, which converts data streams from CAN-bus levels on CAN bus 132 to levels that CAN controller 166 can use, and vice versa. CAN controller 166 may be an integral part of microcontroller 164 (as illustrated) or may be separate from microcontroller 164. Although not shown, an ECU 134 may comprise one or more external-communication interfaces, such as those that utilize cellular, Wi-Fi™, Bluetooth™, and/or other wireless communications, for communications that are external to CAN bus 132. Although not shown, an ECU 134 may also comprise an OBD receiver, Uniform Serial Bus (USB) port, one or more sensors, one or more actuators, and/or other control devices.

In addition, an ECU 134 may comprise a hacking detection system 170, which is described in greater detail elsewhere herein. Hacking detection system 170 may comprise one or more software modules stored in memory 162 and executed by microcontroller 164 and/or CAN controller 166. Alternatively, hacking detection system 170 may comprise a dedicated and separate hardware component within ECU 134. For example, hacking detection system 170 could comprise its own memory to store the software module(s) and/or its own hardware processor to execute the stored software module(s).

It should be understood that not every ECU 134 within a vehicle system 130 may comprise hacking detection system 170. In other words, some ECUs 134 in vehicle system 130 may comprise hacking detection system 170, while other ECUs 134 in the same vehicle system 130 may not comprise any hacking detection system 170. As a simple example with reference to FIG. 1A, ECUs 134A and 134C may comprise hacking detection system 170, while ECUs 134B and 134N do not comprise hacking system 170. In addition, different ECUs 134 may comprise different hacking detection systems 170. For example, with reference again to FIG. 1A, the hacking detection system 170 in ECU 134A may be different than the hacking detection system 170 in ECU 134C (e.g., each hacking detection system 170 may comprise different modules and functions, be of different versions, etc.).

Each hacking detection system 170 may comprise one or more executable software modules (e.g., to be executed by microcontroller 164 and/or CAN controller 166). These executable software module(s) may implement one or more of the various hacking detection and/or mitigation processes described herein. For example, a hacking detection system 170 may comprise executable software module(s) for detecting different types of malicious activity, such as for learning and/or detecting network traffic behavior (e.g., on CAN bus 132 and/or with external network(s) 120), process and memory behavior (e.g., for ECUs and/or other devices), and/or in-vehicle network behavior (e.g., on CAN bus 132 and/or with other system(s) 140 within the vehicle). In addition, each hacking detection system 170 may comprise a local data store. The local data store may be comprised in memory 162 and configured to store CAN identifiers, monitored data, learned behaviors and/or behavioral patterns, a trained machine-learning algorithm or model, and/or the like. Alternatively or additionally, hacking detection system 170 may store this information in a remote data store (e.g., within centralized storage in vehicle system 130, a memory of another system 140, database(s) 114 on a platform 110, etc.).

In an embodiment, one or more hacking detection systems 170 may comprise a gateway to CAN bus 134. Such a gateway hacking detection system 170 may allow a standard computing device (e.g., an OBD device) to communicate with the CAN, for example, via a USB, Ethernet, or OBD port, or wirelessly via a wireless receiver that is communicatively coupled to the gateway hacking detection system 170. In this case, the gateway hacking detection system 170 may monitor external communications with CAN bus 132. It should be understood that, as used herein, the term "external communications" may include any communications that do not utilize CAN bus 132.

1.3. Example Processing Device

Figure 2:
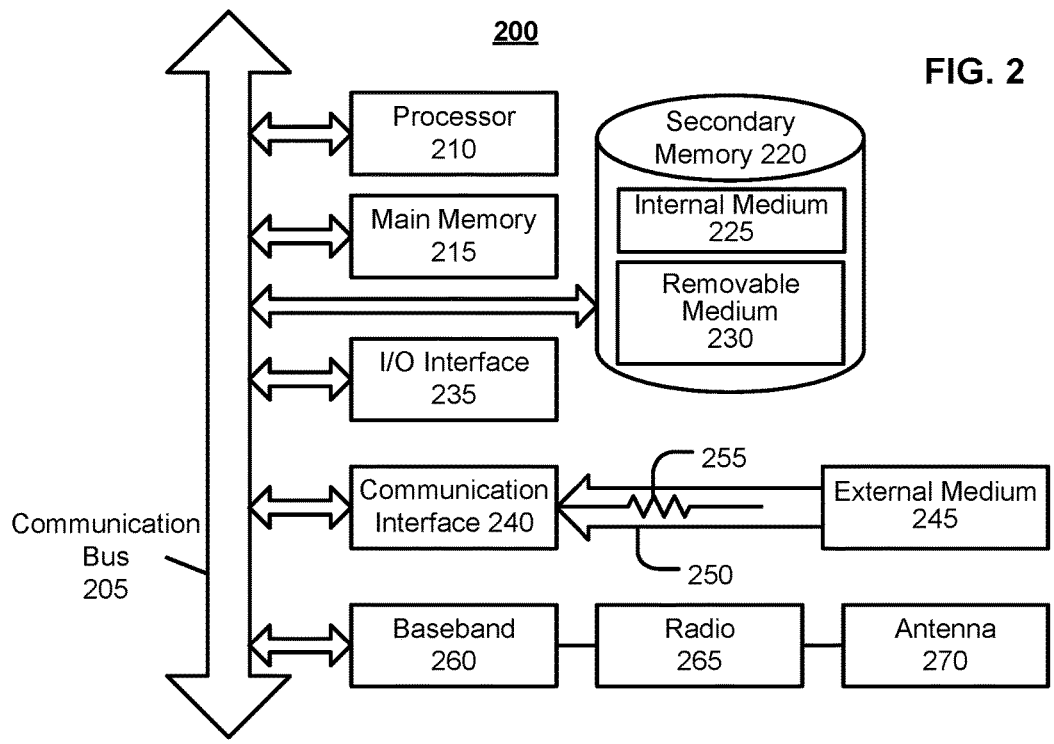
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute one or more software modules implementing the described processes), and may represent components of platform 110, vehicle system(s) 130, other system(s) 140, ECUs 134, hacking detection systems 170 (e.g., if embodied in hardware), user devices, and/or other processing devices described herein. Generally, system 200 can be any processor-enabled device that is capable of wired or wireless data communication. Other computer systems and/or architectures may be also used, as will be clear to those skilled in the art.

System 200 preferably includes one or more processors, such as processor 210. It should be understood that, with respect to ECU 134, microcontroller 164 may comprise one or more processors 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs or other software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs or other software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for detecting and/or mitigating hacking of ECUs within a vehicle will now be described in detail. It should be understood that the described processes may be embodied in one or more software modules that are executed by one or more hardware processors (e.g., processor 210, which, in the context of ECU 134, may be comprised in microcontroller 164). The described processes may be implemented as instructions represented in source code, object code, and/or machine code. These instructions may be executed directly by the hardware processor(s), or alternatively, may be executed by a virtual machine operating between the object code and the hardware processors.

Alternatively, one or more of the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Sub-Networks

Generally, the CAN for a particular vehicle system 130 will have a plurality of ECUs 134 as nodes within the CAN. In an embodiment, each ECU 134 that comprises or is otherwise associated with a hacking detection system 170 joins at least one sub-network of a hacking detection network. The sub-networks may be software-defined, peer-to-peer networks, managed by hacking detection system(s) 170 and overlaid on top of the physical in-vehicle CAN.

ECUs 134, within vehicle system 130, which do not comprise and are not otherwise associated with a hacking detection system 170, do not become part of the hacking detection network. These excluded ECUs 134 may not directly benefit from hacking detection system(s) 170, but may still indirectly benefit from hacking detection system(s) 170, for example, since they will be communicating with uncompromised ECUs which are protected by hacking detection systems 170.

Figure 3:
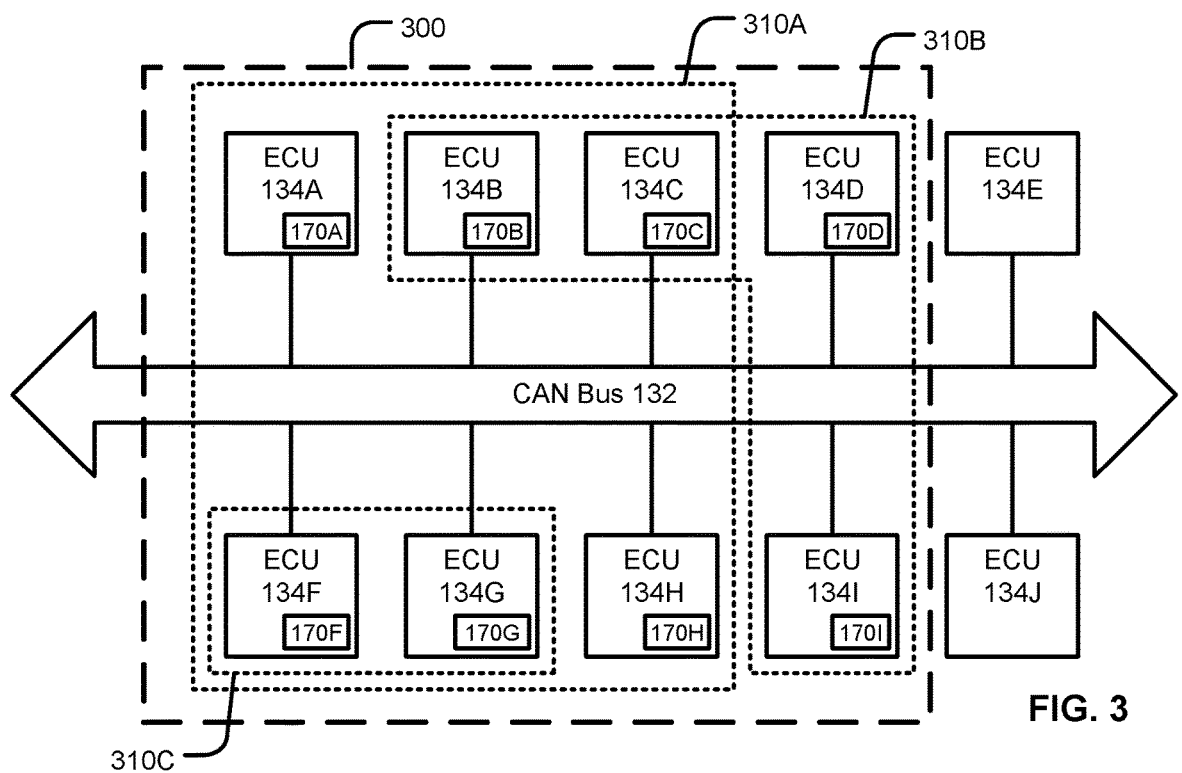
FIG. 3 illustrates an example of a hacking detection network, according to an embodiment.

FIG. 3 illustrates an example of a hacking detection network 300, according to an embodiment. In the illustrated embodiment, each of ECUs 134A-134D and 134F-134I comprise a hacking detection system 170, whereas ECUs 134E and 134J do not comprise a hacking detection system 170. Hacking detection network 300 comprises all of the ECUs 134 that comprise a hacking detection system 170 (i.e., ECUs 134A, 134B, 134C, 134D, 134F, 134G, 134H, and 134I) and excludes any ECUs 134 which do not comprise and are not associated with any hacking detection system 170 (i.e., ECUs 134E and 134J).

In addition, hacking detection network 300 comprises one or more sub-networks 310. In the illustrated example, hacking detection network 300 comprises three sub-networks 310A, 310B, and 310C. Sub-networks 310 may be overlapping or non-overlapping. For example, sub-network 310A comprise ECUs 134A, 134B, 134C, 134F, 134G, and 134H, sub-network 310B comprises ECUs 134B, 134C, 134D, and 134I, and sub-network 310C comprises ECUs 134F and 134G. Thus, ECUs 134B, 134C, 134F, and 134G are each in two different sub-networks, whereas ECUs 134A, 134D, 134H, and 134I are each in only a single sub-network. In other scenarios, there may be a sub-network 310 that does not overlap with any other sub-network 310, and there may be ECUs 134 which are in three or more sub-networks 310. In some instances, hacking detection network 300 may comprise only a single sub-network 310, in which case hacking detection network 300 may be coextensive with sub-network 310.

In an embodiment, hacking detection systems 170 within each sub-network 310 and/or hacking detection network 300 may communicate with each other over CAN bus 132. To this end, a message protocol may be defined for and used by hacking detection systems 170 to communicate with each other. This hacking-detection message protocol may be implemented as an abstraction layer over the CAN bus protocol. The hacking-detection message protocol may define a number of different messages, as described herein.

In an embodiment, the hacking-detection message protocol comprises an introduction message that is sent by a hacking detection system 170 whenever the hacking detection system 170 begins operation. This introduction message may comprise a peer identifier, which uniquely identifies the hacking detection system 170 and/or its respective ECU 134, and a list of CAN identifier(s) used by the respective ECU 134. In this manner, each hacking detection system 170 learns the peer identifier and the CAN identifier(s) associated with that peer identifier for each of the other hacking detection systems 170. Each introduction message may always be encrypted by the transmitting hacking detection system 170 and decrypted by each recipient hacking detection system 170. In addition, each introduction message may comprise a specific code that can be used to verify its validity. For example, one or more hacking detection systems 170 may communicate with a cloud-based server 112 to confirm the validity of the code in any introduction message that it receives, prior to allowing the transmitting hacking detection system 170 to join hacking detection network 300.

Sub-network(s) 310 may be statically or dynamically defined. In an embodiment, both static and dynamic definitions may be possible. For example, during initialization of hacking detection network 300, the initializing system (e.g., a master hacking detection system 170) may check a non-volatile memory (e.g., of the master hacking detection system 170, vehicle system 130, etc.) for a static definition of hacking detection network 300. If a static definition is found, the initializing system may utilize the static definition to define sub-network(s) 310, as described below. Otherwise, if no static definition is found, the initializing system may instead implement a dynamic definition of sub-network(s) 310, as described below.

In a static implementation, the original equipment manufacturer (OEM) of vehicle system 130 or the vehicle manufacturer may predefine the configuration of hacking detection network 300, including each sub-network 310. For example, the predefined configuration may identify each sub-network 310 and the ECUs 134 within each sub-network 310. Each ECU 134 may be identified by the specific CAN identifiers that it utilizes and/or a unique peer identifier with which it is associated (e.g., a Media Access Control (MAC) address of the ECU 134). This predefined configuration may be stored in persistent, non-volatile memory (e.g., secondary memory 220 of vehicle system 130), and loaded (e.g., by a master hacking detection system 170) each time vehicle system 130 is started.

In a dynamic implementation, hacking detection system(s) 170 may automatically learn and define sub-network(s) 310 during an initial learning stage. This initial learning stage may begin as soon as hacking detection system(s) 170 and/or ECUs 134, comprising hacking detection system(s) 170, are booted (e.g., during boot-up of vehicle system 130). In the initial learning stage, each hacking detection system 170 may monitor the CAN identifier(s) in CAN messages being transmitted and received by its associated ECU 134 on CAN bus 132. In addition, each hacking detection system 170 may broadcast the CAN identifier(s), being transmitted by its associated ECU 134, optionally with the peer identifier, to each of the other hacking detection systems 170 within hacking detection network 300. Thus, each hacking detection system 170 can correlate the CAN identifiers, being received in CAN messages at its associated ECU 134, with the ECUs 134 that transmitted those CAN messages. Generally, each ECU 134 may only utilize a single CAN identifier, representing the priority of CAN messages being sent by that ECU 134. However, it is possible for a single ECU 134 to utilize two or more CAN identifiers (e.g., if the ECU 134 transmits CAN messages of different priorities). As used herein, CAN messages of the same "type" may refer to CAN messages that comprise the same CAN identifier (i.e., have the same priority).

Each hacking detection system 170 can determine which CAN messages, received by its associated ECU 134, are being processed by that associated ECU 134 (i.e., those CAN messages which are being further processed after being read, as opposed to simply being discarded). Based on this information, each hacking detection system 170 can identify the type of CAN messages that are normally processed by its associated ECU 134. Additionally or alternatively, each hacking detection system 170 (e.g., hacking detection system 170A) can identify which ECUs 134 (e.g., ECUs 134B-134D, 134F-134I), within hacking detection network 300, transmit messages that are used by its associated ECU 134 (e.g., ECU 134A). Each hacking detection system 170 may transmit this information, comprising the types of CAN messages processed by its associated ECU 134 and/or the identities of ECUs 134 within hacking detection network 300 whose messages are used by its associated ECU 134, to a master hacking detection system 170 within hacking detection network 300.

The master hacking detection system 170 may be selected by any known means. However, in an embodiment, each hacking detection system 170 may wait for a period of time after becoming operational (e.g., a predefined time period sufficient to ensure that all hacking detection systems 170 are operational), and then send a probe message, according to the hacking-detection message protocol, to determine whether or not a master exists, and, if so, who is the master. In response to a probe message, each receiving hacking detection system 170 (e.g., 170A) may transmit a request message, according to the hacking-detection protocol, that requests a confirmation message if the receiving hacking detection system 170 is the master. The hacking detection system 170 that transmitted the request message then waits for a period of time (e.g., a predefined time period sufficient for all hacking detection systems 170 to receive and respond to the request message), and checks the number of confirmation messages that have been received. If exactly one confirmation message has been received, then the hacking detection system 170 (e.g., 170B) that sent the single confirmation message is selected as the master by the hacking detection system 170 (e.g., 170A) that received the confirmation message. If no confirmation message has been received (i.e., indicating no master) or more than one confirmation message has been received (i.e., indicating multiple masters), the hacking detection system 170 (e.g., 170A) may initiate a new master-selection mode by transmitting a master-selection message, according to the hacking-detection message protocol, to all of the other hacking detection systems 170.

Upon receiving a master-selection message, each hacking detection system 170 may reset any peer identifier stored for the master (e.g., in its local data store). A hacking detection system 170 (e.g., 170A, who initiated the master-selection mode) may transmit a broadcast message, according to the hacking-detection message protocol, requesting a response from any hacking detection system 170 which is able and willing to be the master. In response to the broadcast message, any hacking detection system 170 that is able and willing to be the master transmits a candidate message, according to the hacking-detection message protocol, to announce itself as a candidate for master. Upon receiving a candidate message, each hacking detection system 170 adds the peer identifier associated with the hacking detection system 170 that transmitted the candidate message to a list of candidates representing the ballot for master. If the receiving hacking detection system 170 is also able and willing to be the master, it will add its own peer identifier to the list of candidates, in addition to transmitting a candidate message. Each hacking detection system 170 may wait for a period of time (e.g., a predefined time period) to allow a full list of candidates to be generated.

In an embodiment, each hacking detection system 170 determines whether or not it is able and willing to be the master based on the available resources (e.g., processor and/or memory capacity) of its respective ECU 134. This determination may be made by each hacking detection system 170 at runtime (e.g., at the time it receives the broadcast message for candidate selection). Thus, if a hacking detection system 170 determines that it does not have sufficient resources, it may abstain from nominating itself as a candidate to become master.

Once the list of candidates for master has been generated, each hacking detection system 170 may select a single master from the list of candidates based on a common strategy. For example, the strategy may be to select the candidate with the highest ECU priority (e.g., the respective ECU having the lowest CAN identifier) as the master. Alternatively, the strategy may be to select the candidate with the lowest ECU priority (e.g., the respective ECU having the highest CAN identifier) as the master. Regardless of the strategy that is used, since the list of candidates and strategy will be the same at each hacking detection system 170, each hacking detection system 170 will arrive at the same conclusion. Thus, the hacking detection system 170, which is determined to be the master under the strategy, may send a master message, according to the hacking-detection message protocol, that confirms that it is the master to all of the other hacking detection systems 170. Each hacking detection system 170, that receives the master message and agrees with electing the transmitting hacking detection system 170 to be the master, may then respond with a confirmation message, according to the hacking-detection message protocol. In this manner, the elected hacking detection system 170 will become the master. In an embodiment, a master hacking detection system 170 may be selected for each sub-network 310. Alternatively or additionally, a master hacking detection system 170 may be selected for the entire hacking detection network 300.

In addition, the second-place candidate from the list of candidates (i.e., the candidate which would have been selected as the master had the selected master not been in the candidate list), may be selected as a backup master. Alternatively, the master hacking detection system 170 may select its own backup (e.g., from the candidate list). If the master hacking detection system 170 drops out from hacking detection network 300 for any reason (e.g., due to a hardware or software failure. a bus-off state of its respective ECU 134, etc.), the backup master hacking detection system 170 may then take its place as master.

After waiting for a period of time (e.g., a predefined time period), the elected master hacking detection system 170 may transmit a new master message, according to the hacking-detection message protocol, that declares itself to be the master. In response, each hacking detection system 170 that receives this new master message may update the peer identifier for its master (e.g., stored in its local data store) to the peer identifier of the elected master hacking detection system 170. If any hacking detection system 170 does not agree with this new master message, that dissenting hacking detection system 170 can send a message, according to the hacking-detection message protocol, to re-initiate the new master-selection mode. In an embodiment, the number of consecutive re-initiations may be limited to a predetermined number.

In an embodiment, each hacking detection system 170 transmits a keep-alive message (e.g., according to the hacking-detection message protocol). If the master hacking detection system 170 stops transmitting a keep-alive message or stops responding (e.g., because of a software or hardware failure, because its respective ECU 134 is in the bus-off state, etc.), the backup hacking detection system 170 becomes the new master, and transmits the new master message, according to the hacking-detection system. Alternatively, a new master-selection mode may be initiated. In addition, if the master hacking detection system 170 detects that another hacking detection system 170 has stopped transmitting its keep-alive message or has missed a certain number of keep-alive messages, the master hacking detection system 170 may take appropriate action (e.g., generating an alert) since this may indicate malicious activity.

In an embodiment of the dynamic implementation, the master hacking detection system 170 collects the information from all of hacking detection systems 170 within hacking detection network 300, and determines sub-networks 310 based on the collected information. For example, hacking detection system 170A on ECU 134A may be selected as the master hacking detection system 170 for hacking detection network 300. Master hacking detection system 170A may collect the information, from each of hacking detection systems 170B, 170C, 170D, 170F, 170G, 170H, and 170I, comprising the types of CAN messages processed by their associated ECU, the identities of ECUs 134 or other peer identifiers within hacking detection network 300 whose CAN messages are used by their associated ECUs (i.e., ECUs 134B, 134C, 134D, 134F, 134G, 134H, and 134I, respectively), and/or other patterns in the reception and/or transmission of CAN messages (e.g., time patterns in which CAN messages are transmitted and/or received, patterns in the payloads of CAN messages, etc.). Master hacking detection system 170A may collect the information by broadcasting a message, according to the hacking-detection message protocol, to request peer information from all of the other hacking detection systems 170. In response, each of the other hacking detection systems 170 provides the peer information, via the hacking-detection message protocol, to the master hacking detection system 170A. Master hacking detection system 170A may store the collected peer information in its local data store. In addition, the backup hacking detection system 170 may also store this peer information in its local data store, so that it has the peer information should it need to become master (e.g., due to a failure at master hacking detection system 170A).

Master hacking detection system 170A may also identify a criticality level for each ECU 134 (e.g., based on payload patterns). For example, the criticality level for a particular ECU 134 may be based on one or more factors, including, without limitation, the transmission of high priority messages by the ECU 134, the number of functions handled by the ECU 134, the number of high priority messages transmitted and/or used by the ECU 134, and/or the like. These factors may be weighted to arrive at a weighted criticality score, with one or more criticality levels being defined as sub-ranges or thresholds within the range of possible criticality scores. Based on the identified criticality levels for each ECU 134, master hacking detection system 170A may separate hacking detection systems 170 into sub-networks 310A, 310B, and 310C. For instance, master hacking detection node 170A may determine, based on the collected information, that ECUs 134F and 134G are strongly related (e.g., because they use messages from each other extensively and/or use a certain type of CAN message, are both critical to a safety system of vehicle 160, etc.), and therefore, group them into sub-network 310C. Master hacking detection node 170A may similarly determine, based on the collected information, that ECUs 134A, 134B, 134C, 134F, 134G, and 134H are also related (e.g., because they process messages from each other regularly and/or all use a different type of CAN message than was used to define sub-network 310C, are all critical to a particular system 140 of vehicle 160), and therefore, group them into sub-network 310A. Similarly, master hacking detection system 170A may group ECUs 134B, 134C, 134D, and 134I into sub-network 310B, based on the collected information. Essentially, for dynamic sub-network creation, the master hacking detection system 170 may determine and form sub-networks 310 of ECUs 134 that ensure that each ECU 134 that listens to a particular type of CAN message transmitted by another ECU 134 is within the same sub-network 310 as that transmitting ECU 134.

Once sub-network(s) 310 have been defined in this manner, in the initial learning stage, the master hacking detection system 170 may inform the other hacking detection systems 170 within hacking detection network 300 about the sub-network(s) 310 of which they are a part, for example, via one or more messages of the hacking-detection message protocol. For example, the master hacking detection system 170 may provide each hacking detection system 170 with a list of all of the CAN identifiers and/or peer identifiers for ECUs 134 within that hacking detection system's respective sub-network 310.

In an embodiment, the configuration of hacking detection network 300, including each defined sub-network 310, is stored in persistent, non-volatile memory (e.g., secondary memory 220 of vehicle system 130, memory 162 of an ECU 134, etc.). For example, the master hacking detection system 170 may store the dynamically learned configuration of hacking detection network 300 in non-volatile memory. Then, every time that vehicle system 130 is started in the future, this configuration may be read from that memory (e.g., by the selected master hacking detection system 170) and used to redefine sub-network(s) 310. Thus, there is no need to perform the initial learning stage again.

Alternatively, the initial learning stage can be performed again (e.g., by the selected master hacking detection system 170) to identify a new configuration (e.g., comprising re-learned sub-network(s) 310), and this new configuration can be compared to the old configuration read from memory to identify differences in the two configurations. Any differences may represent an irregularity and/or behavioral change. Thus, for example, the selected master hacking detection system 170 may compare the old and new configurations, and determine whether or not the differences represent potential malicious activity. In the event that the differences in the configuration may represent malicious activity, the master hacking detection system 170 may then report the potential malicious activity (e.g., in any of the manners discussed elsewhere herein). For example, if the old configuration includes an ECU 134 which the new configuration excludes, the master hacking detection system 170 may generate an alert indicating that this excluded ECU 134 has been compromised (e.g., because the hacking detection system 170 on this ECU 134 has apparently been removed).

In an embodiment, when a new hacking detection system 170 boots up (e.g., due to installation during runtime), the master hacking detection system 170 for that sub-network 310 dynamically adds the new hacking detection system 170 to the sub-network 310. For example, whenever an ECU 134 with a hacking detection system 170 boots up, the hacking detection system 170 may transmit an encrypted introduction message, according to the hacking-detection message protocol, on CAN bus 132, to inform the other hacking detection systems 170 of its presence. When the master hacking detection system 170 detects the new hacking detection system 170, the master hacking detection system 170 may transmit a command to the new hacking detection system 170 to share its properties with each hacking detection system 170 in the sub-network 310, and/or command all of the hacking detection systems 170 in the sub-network to share their properties with the new hacking detection system 170. These commands may be transmitted via the hacking-detection message protocol defined for hacking detection systems 170. The master hacking detection system 170 may also update the stored configuration for the updated sub-network 310 in non-volatile memory.

In an embodiment, a security policy may be applied to each sub-network 310 within hacking detection network 300. The security policies may be the same or different for different sub-networks 310, and may depend on the application and/or network security of each particular sub-network 310. For example, the security policy for sub-network 310A may be different than the security policy for sub-network 310B, but may be identical to the security policy for sub-network 310C. Each sub-network 310 and its associated security policy may be formed based on the criticality level of ECUs 134 within the sub-network 310. For example, a set of critical ECUs 134 (e.g., ECUs which control safety systems, vehicle control systems, etc.) may be assigned to the same sub-network 310 and may be associated with the most restrictive security policy to minimize the possibility or potential damage of malicious activity and/or maximize the detection capabilities of hacking detection systems 170. A security policy may include, without limitation, a requirement for secure (e.g., encrypted) communications within the CAN, a requirement for short-term security certificates for communications with a public network, a requirement for long-term security certificates for communications within the CAN, thresholds for hacking detection (e.g., lower confidence thresholds for the classification of malicious activity in more critical sub-networks 310, and higher confidence thresholds in less critical sub-networks 310), an alert level for malicious activity (e.g., higher alert levels for more critical sub-networks 310, and lower alert levels for less critical sub-networks 310), and/or the like.

2.2. Risk Profiles

In an embodiment, each hacking detection system 170 may scan or probe its associated ECU 134 to identify any software-based vulnerabilities. For example, the hacking detection system 170 for a particular ECU 134 may monitor the processes executing on the microcontroller 164 of the particular ECU 134, monitor access to memory 162, monitor network access (e.g., via an external-communication interface), and/or the like. Based on this monitored information, the hacking detection system 170 may generate a risk profile of its associated ECU 134. Additionally or alternatively, a master hacking detection system 170 may collect the monitored information or aggregate the ECU-specific risk profiles from all hacking detection systems 170 (e.g., including itself), and generate an aggregate risk profile for hacking detection network 300, the CAN, and/or the entire vehicle system 130.

The risk profile may comprise a risk score. Based on the risk profile, the master hacking detection system 170 or an overarching system may recommend remedial actions to improve the risk score. These recommendations can be provided to the OEM of the ECU 134 or vehicle system 130 being profiled, the vehicle manufacturer, and/or users of the vehicle (e.g., on a display within the vehicle during operation of the vehicle).

In an embodiment, the risk score may be calculated by testing vulnerabilities at one or more abstraction layers, including, without limitation, a network layer, a device layer, and/or an in-vehicle network layer. For example, hacking detection system 170 may attempt one or more operations, representing vulnerabilities, such as attempting to connect to a predefined safe site, attempting to send some vehicle information to a predefined external test interface, attempting to access a restricted memory area, attempting to make an inter-process connection, attempting to perform a restricted operation (e.g., killing a system process), attempting to transmit an unknown message, attempting to transmit a known CAN message with an invalid payload, attempting to transmit a diagnostic message, and/or the like. Each attempted operation may be associated with a weight based on the criticality of the vulnerability that it represents. The result of each operation (e.g., with a successful operation representing the presence of a vulnerability, and an unsuccessful operation representing the absence of a vulnerability) may be combined with its associated weight, and the resulting scores may be used to compute a total risk score.

2.3. Hacking Detection

In an embodiment, each hacking detection system 170 monitors every CAN message that is transmitted and/or received by its associated ECU 134. For example, hacking detection system 170A may monitor every CAN message that is transmitted and received by ECU 134A via CAN bus 132. In addition, each hacking detection system 170 may monitor one or more behaviors (e.g., process behavior, memory accesses, external communications, etc.) of its associated ECU 134.

Each hacking detection system 170 may share what it learns with the selected master hacking detection system 170 and/or all of the other hacking detection systems 170 in its sub-network 310 and/or in the entire hacking detection network 300. In an embodiment, each hacking detection system 170 shares its learned information with every other hacking detection system 170 within its sub-network 310, such that each hacking detection system 170 in a given sub-network 310 stores identical information. Using this shared information, a number of different hacking-detection techniques, discussed below, may be employed to detect or otherwise mitigate malicious activity. It should be understood that the disclosed hacking-detection techniques may be used alone or in any combination.

2.3.1. Source Validation

In an embodiment, each hacking detection system 170 within a given sub-network 310 shares health information, indicating the health of its associated ECU 134, to every other hacking detection system 170 within the sub-network 310. This health information may be shared using the hacking-detection message protocol, and may comprise the CAN identifier(s) used by the associated ECU 134 (and optionally the peer identifier of the associated ECU 134). Thus, each hacking detection system 170 knows the CAN identifier(s) of each ECU 134 having a hacking detection system 170 installed, within its sub-network 310. Consequently, if a hacking detection system 170 receives a CAN message with a CAN identifier that is associated with an ECU 134, known to have a hacking detection system 170, the hacking detection system 170 can generally trust that CAN message. Otherwise, if the hacking detection system 170 receives a CAN message with a CAN identifier that is not associated with any ECU 134, known to have a hacking detection system 170, the hacking detection system 170 may treat that CAN message with suspicion. A suspicious CAN message may represent malicious activity in the CAN, and the detecting hacking detection system 170 may take appropriate action. At the very least, a hacking detection system 170 may treat a suspicious CAN message more cautiously than a CAN message received from a trusted source.

Since each hacking detection system 170 sees all CAN identifiers on the CAN bus 132 and knows all CAN identifiers associated with an ECU 134 having a hacking detection system 170 installed, each hacking detection system 170 can also determine which ECUs 134 in vehicle system 130 do not have a hacking detection system installed, as long as those ECUs 134 have transmitted on CAN bus 132 at some point. Specifically, if a hacking detection system 170 sees a CAN identifier on CAN bus 132, which has not already been notified from another hacking detection system 170 and stored in its local data store, the hacking detection system 170 can assume that the ECU 134, which transmitted that CAN identifier, does not have a hacking detection system 170 installed. As an example, hacking detection system 170A may receive CAN identifiers from hacking detection systems 170B, 170C, 170D, 170F, 170G, 170H, and 170I (e.g., during the initial learning stage, as health information, etc.), and store them in its local data store. Then, whenever hacking detection system 170A sees a CAN identifier, used in a message on CAN bus 132, it may compare the seen CAN identifier to the CAN identifiers in the local data store. If the seen CAN identifier matches one of the stored CAN identifiers, hacking detection system 170A can assume that the message is from a valid and trusted source. On the other hand, if the seen CAN identifier does not match any of the stored CAN identifiers (e.g., because it is a CAN identifier used by ECU 134E or 134J, which do not have hacking detection systems 170), hacking detection system 170A can assume that the message is from an invalid or untrusted source, and act accordingly.

If a hacking detection system 170 previously received health information (e.g., the keep-alive message discussed elsewhere herein) from another hacking detection system 170, but has not received health information from that hacking detection system 170 for a predetermined amount of time (e.g., a known or learned bus-off duration for that hacking detection system 170) or when health information is otherwise expected (e.g., a predetermined amount of time after booting), the hacking detection system 170 may determine that that there is potential malicious activity occurring with respect to that hacking detection system 170, and take appropriate action. For example, hacking detection system 170A may have previously received health information from hacking detection system 170B within sub-network 310A, but has not received health information from hacking detection system 170B over a time period that is longer than the bus-off duration that hacking detection system 170A has learned for hacking detection system 170B. In this case, hacking detection system 170A may generate an alert. Additionally or alternatively, when a CAN identifier has not been seen in health information from other hacking detection systems 170 for a predetermined amount of time (e.g., a bus-off duration for the ECU 134 associated with the CAN identifier), hacking detection system 170 may delete that CAN identifier from its local data store, thereby treating the previously trusted CAN identifier as untrusted.

In an alternative or additional embodiment, each hacking detection system 170 may add a fingerprint or other signature or code to each CAN message (e.g., within the payload of each CAN message) prior to transmission of that CAN message by the associated ECU 134. Each hacking detection system 170 within hacking detection network 300 may utilize a different signature or the same signature. Alternatively, each hacking detection system 170 in a particular sub-network 310 could use the same signature, and each sub-network 310 could use a different signature. The hacking detection system 170 in each ECU 134, that receives a CAN message, may then read the added signature (e.g., from the payload) and compare it to known signatures (e.g., within a local data store of hacking detection system 170). If the received signature matches a known signature, hacking detection system 170 may determine that the source is valid and trusted. Otherwise, if the received signature does not match a known signature, hacking detection system 170 may determine that the CAN message is not from a trusted source and/or may represent malicious activity.

Figure 4:
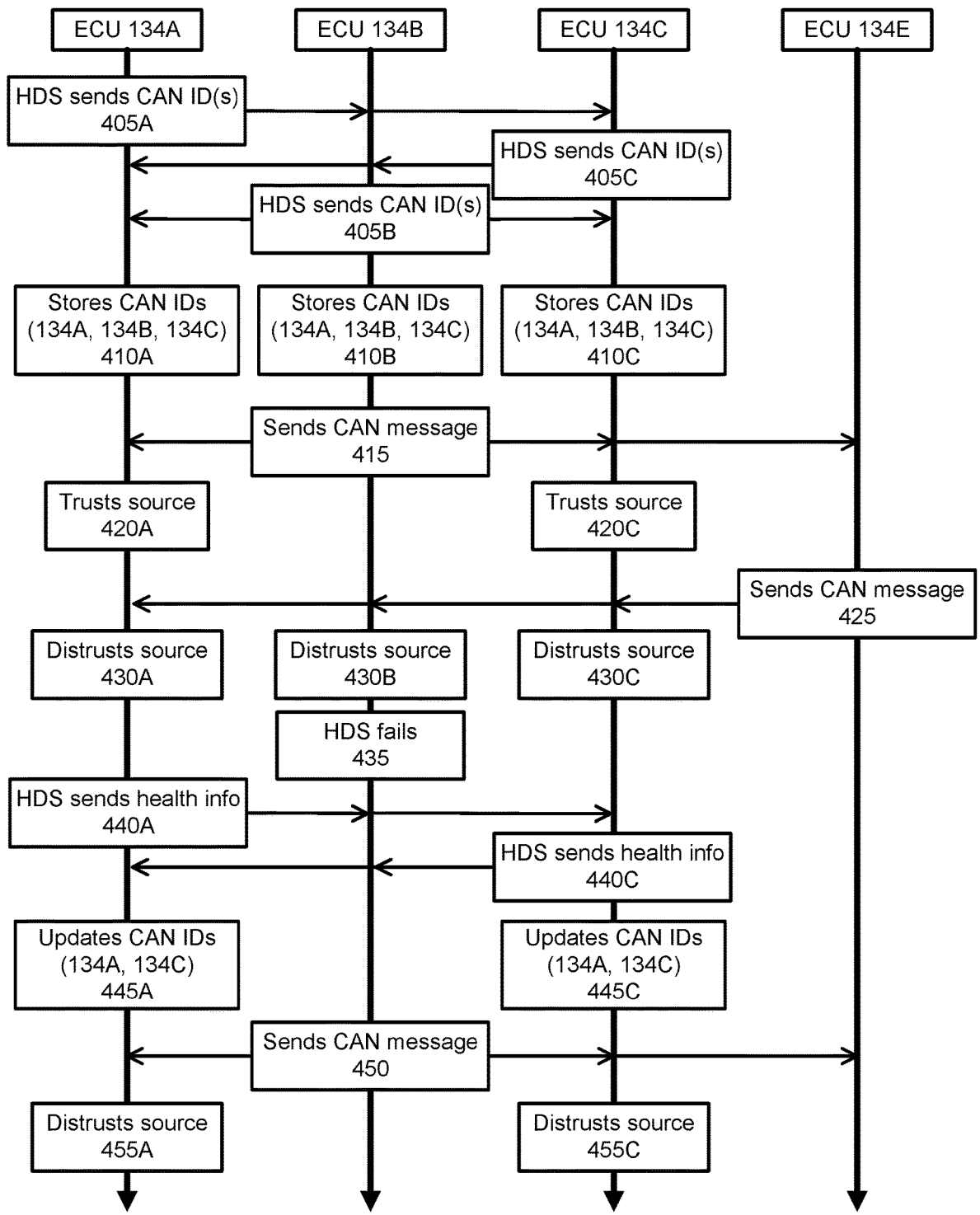
FIG. 4 illustrates some example scenarios to demonstrate source validation, according to an embodiment.

FIG. 4 illustrates some example scenarios to demonstrate source validation, according to an embodiment. For purposes of the illustration, it is assumed that ECUs 134A, 134B, and 134C are each associated with a hacking detection system 170 as a node within a sub-network 310, whereas ECU 134E is not protected by any hacking detection system 170. In steps 405A, 405B, and 405C, each hacking detection system 170 on ECUs 134A, 134B, and 134C, respectively, transmits a message with the CAN identifier(s) used by its respective ECU 134. This message may be transmitted on CAN bus 132 using the hacking-detection message protocol described herein. Notably, since ECU 134E is not associated with any hacking detection system 170, no similar message is sent by ECU 134E.

In steps 410, each of the hacking detection systems 170 on CAN bus 132 store the CAN identifiers that have been notified from other hacking detection systems 170, via the transmissions in steps 405. In addition, each hacking detection system 170 may store the CAN identifier(s) that its own ECU 134 utilizes. For example, in steps 410A, 410B, and 410C, the hacking detection system 170 of ECUs 134A, 134B, and 134C, respectively, each stores the CAN identifiers used by ECUs 134A, 134B, and 134C. These CAN identifiers may be stored in a local data store of each hacking detection system (e.g., within memory 162 of each respective ECU 134). Notably, since there is no hacking detection system 170 on ECU 134E, no hacking detection system 170 stores the CAN identifier(s) used by ECU 134E.

In step 415, ECU 134B transmits an ordinary CAN message on CAN bus 132. It should be understood that this CAN message will comprise the CAN identifier used by ECU 134B. Each of ECUs 134A, 134B, 134C, and 134E read the CAN message. In addition, since the hacking detection systems 170 on ECUs 134A, 134B, and 134C are monitoring each message received by its respective ECU 134 on CAN bus 132, these hacking detection systems 170 see the CAN message transmitted by ECU 134B. Because the CAN identifier in the CAN message matches a CAN identifier stored in their local data stores, the hacking detection systems 170 of ECUs 134A and 134C both trust the source (i.e., ECU 134B) of the CAN message in steps 420A and 420C, respectively. In other words, ECUs 134A and 134C know to trust ECU 134B based on the CAN identifier in the CAN message transmitted in step 415.

In contrast, when ECU 134E transmits an ordinary CAN message on CAN bus 132 in step 425, ECUs 134A, 134B, 134C each distrust ECU 134E in steps 430A, 430B, and 430C, respectively. Specifically, each of ECUs 134A, 134B, and 134C reads the CAN message transmitted by ECU 134E. In addition, since the hacking detection systems 170 on ECUs 134A, 134B, and 134C are monitoring each message received by its respective ECU 134 on CAN bus 132, these hacking detection systems 170 see the CAN message transmitted by ECU 134E. Because the CAN identifier in the CAN message does not match any CAN identifier stored in their local data stores, the hacking detection systems 170 of ECUs 134A, 134B, and 134C each distrusts the source of the CAN message in steps 430A, 430B, and 430C, respectively.

Next, assume that the hacking detection system 170B of ECU 134B fails in step 435, for example, due to a software failure, a hardware failure, a bus-off state, and/or malicious activity. In this case, when the time comes to transmit health information, using the hacking-detection message protocol, in step 440, the health detection systems 170A and 170C of ECUs 134A and 134C, respectively, will each send out the health message on CAN bus 132 in steps 440A and 440C, respectively, but health detection system 170B of ECU 134B will not, since it has experienced a failure. Thus, since no health information was received from health detection system 170B of ECU 134B, in steps 445A and 445C, each of hacking detection systems 170A and 170C, respectively, will update the CAN identifiers stored in their local data stores to remove the CAN identifier(s) associated with ECU 134B, while retaining the CAN identifier(s) for any ECU 134 for which a health message was received at the appropriate timing. In an embodiment, hacking detection systems 170A and 170C may wait for a certain period of time or a certain number of missed health information messages from hacking detection system 170B before removing the CAN identifier(s) associated with ECU 134B.

Next, if ECU 134B transmits an ordinary CAN message on CAN bus 132, ECUs 134A and 134C will no longer trust ECU 134B. Specifically, since the hacking detection systems 170A and 170C on ECUs 134A and 134C, respectively, are monitoring each message received by its respective ECU 134 on CAN bus 132, these hacking detection systems 170 see the CAN message transmitted by ECU 134B. Because the CAN identifier in the CAN message no longer matches any CAN identifier stored in their local data stores, the hacking detection systems 170A and 170C each distrust the source of the CAN message in steps 455A and 455C, respectively. It is possible that this CAN message represents an impersonation attack.

2.3.2. Impersonation Detection

Hacking detection system 170 may be configured to determine that another ECU 134 is in the bus-off state by monitoring CAN messages received by its associated ECU 134. For example, since hacking detection system 170A on ECU 134A monitors each CAN message received by ECU 134A, hacking detection system 170A can track and store each CAN identifier that is received in each CAN message and the time at which it was received (e.g., in a local data store). If a particular CAN identifier, used for example by ECU 134B, is not seen for a predetermined time period (e.g., a certain number of seconds), hacking detection system 170A may determine that ECU 134B is in the bus-off state.

As another example, hacking detection system 170 may identify a cycle in which a particular CAN identifier is received, and determine that an ECU 134 is in the bus-off state based on this identified cycle. For instance, hacking detection system 170A of ECU 134A may determine that ECU 134B transmits CAN messages cyclically (e.g., at regular time intervals) based on the CAN identifier used by ECU 134B appearing on CAN bus 132 in a certain cycle. Thus, if hacking detection system 170A does not detect a CAN message from ECU 134B (e.g., based on the CAN identifier used by ECU 134B) after the expected interval (e.g., within a range of the time at which the next cyclical CAN message is expected), hacking detection system 170A may determine that ECU 134B is in the bus-off state. An ECU 134 can transmit multiple types of CAN messages (e.g., identified by different CAN identifiers). Hacking detection system 170 may determine that an ECU 134 is in a bus-off state if none of the different types of CAN messages, transmitted by that ECU 134, appear on CAN bus 132 within learned cycles for those types of CAN messages and/or for a predetermined period of time.

When a hacking detection system 170 determines that a particular ECU 134 is in the bus-off state, it may determine that any CAN message that is received from that ECU 134 (e.g., having a CAN identifier used by that ECU 134) may represent malicious activity. Specifically, such a CAN message may represent an attempt by another device or a hacker to spoof or impersonate the ECU 134 while that ECU 134 is in the bus-off state.

During the initial learning stage, described elsewhere herein, each hacking detection system 170 may learn the bus-off duration of each ECU. The bus-off duration for an ECU 134 is the time period in which that ECU 134 normally remains in the bus-off state before exiting the bus-off state. Based on this information, hacking detection system 170 may calculate the time at which an ECU 134, which has been determined to be in the bus-off state, is expected to transition back to a bus-on state. For example, when hacking detection system 170A determines that ECU 134B is in the bus-off state, hacking detection system 170A may add the bus-off duration, learned for ECU 134B, to the current time, to determine the time at which ECU 134B will exit the bus-off state. If hacking detection system 170A detects a CAN message from ECU 134B (e.g., having a CAN identifier used by ECU 134B) before the time at which ECU 134B is expected to exit the bus-off state, hacking detection system 170A may determine that the CAN message represents an impersonation attack. Otherwise, if the CAN message is received after the time at which ECU 134B is expected to exit the bus-off state, hacking detection system 170A may determine that the CAN message does not represent malicious activity. In other words, any CAN message that is received from an ECU 134 that is believed to be in the bus-off state may be detected as a possible impersonation attack.

Figure 5:
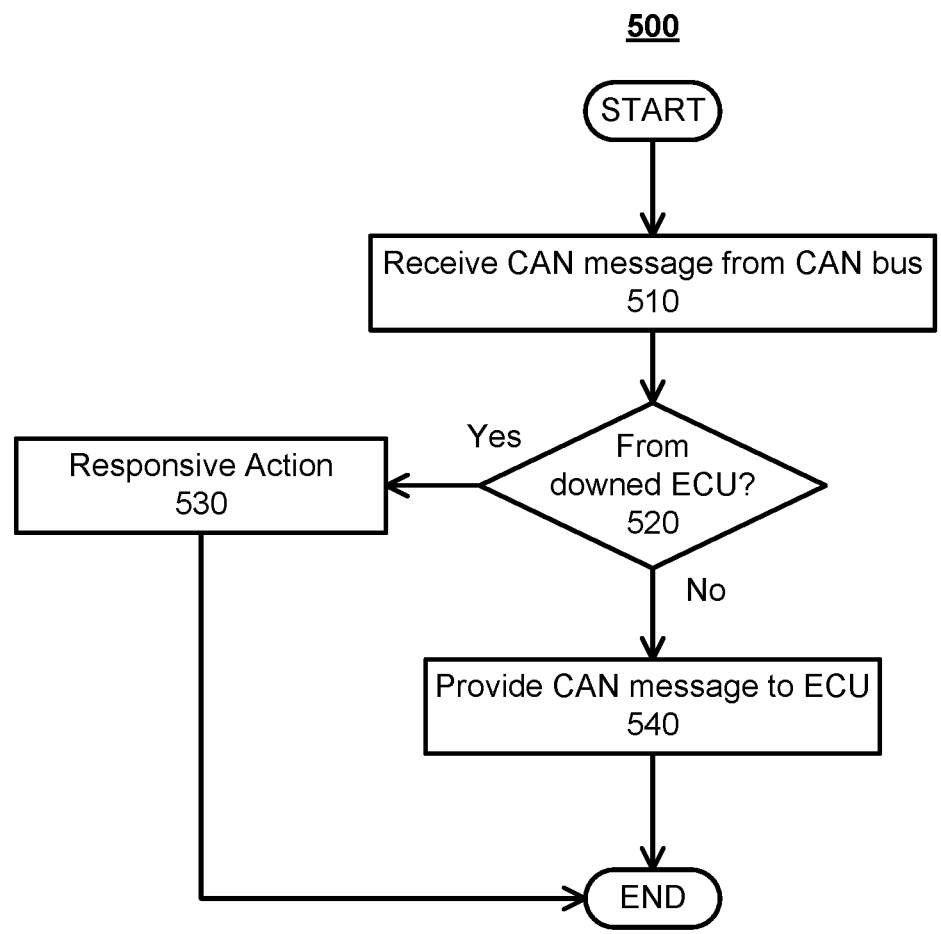
FIG. 5 illustrates a process for impersonation detection, according to an embodiment.

FIG. 5 illustrates a process 500 for impersonation detection, according to an embodiment. Process 500 may be implemented by a hacking detection system 170 monitoring each CAN message received by its associated ECU 134 via CAN bus 132. To aid in understanding, it will be assumed that hacking detection system 170A on ECU 134A is implementing process 500 to monitor CAN messages.

In step 510, hacking detection system 170A receives a CAN message that has been received by its associated ECU 134A on CAN bus 132. Hacking detection system then determines whether the CAN message was transmitted by an ECU 134 in a downed state. For example, assume that the CAN message was transmitted by ECU 134B. When hacking detection system 170A determines that ECU 134B has entered a bus-off state, as described above, hacking detection system 170A may store the CAN identifier(s) associated with ECU 134B in association with an indication that ECU 134B is in the bus-off state, in its local data store. Hacking detection system 170A may remove this association once a bus-off duration for ECU 134B has passed since the association was stored. Similarly, when hacking detection system 170A determines that ECU 134B has failed (e.g., due to a hardware failure), hacking detection system 170A may store the CAN identifier(s) associated with ECU 134B in association with an indication that ECU 134 has failed, in its local data store. Thus, when the CAN identifier in the CAN message, received from ECU 134B in step 510, matches one of these CAN identifiers that is associated, in the local data store, with an indication that the ECU 134B is downed, hacking detection system 170A may determine that the CAN message is from a downed ECU 134 (i.e., "Yes" in step 520). Otherwise, if the CAN identifier in the CAN message does not match any of these CAN identifiers associated with downed ECUs 134, hacking detection system 170 may determine that the CAN message is not from a downed ECU 134 (i.e., "No" in step 520).

If the CAN message is from a downed ECU 134 (i.e., "Yes" in step 520), in step 530, hacking detection system 170A may determine that an impersonation attack is being attempted, and perform an appropriate responsive action. The responsive action may comprise discarding the CAN message, such that the ECU 134A does not further process the CAN message. Additionally or alternatively, hacking detection system 170A may issue an alert, as discussed elsewhere herein.

On the other hand, if the CAN message is not from a downed ECU 134 (i.e., "No" in step 520), in step 540, hacking detection system 170 may provide the CAN message to the associated ECU 134A for further processing. Alternatively or additionally, hacking detection system may apply additional hacking detection techniques to the CAN message before providing the CAN message to the associated ECU 134.

2.3.3. Encryption

In an embodiment, hacking detection system 170 for a particular ECU 134 may encrypt each CAN message transmitted by that particular ECU 134. Alternatively, the hacking detection system 170 may determine whether or not a CAN message should be encrypted before transmission. For example, hacking detection system 170 may only encrypt those CAN messages which are intended for other ECUs 134 that have a hacking detection system 170 installed. If a particular CAN message is intended for at least one ECU 134 that does not comprise and is not associated with any hacking detection system 170, hacking detection system 170 may refrain from encrypting that particular CAN message, but may continue to encrypt other CAN messages which are not intended for any ECUs 134 without a hacking detection system 170.

The encryption of CAN messages by hacking detection system 170 may be performed using any known encryption mechanisms, such as by using the keys of digital certificates. In an embodiment, the key used by hacking detection system 170 may change over time, and, in some cases, very frequently.

It should be understood that it is the payload of the CAN message that is encrypted. The payload of the entire CAN message may be encrypted as a whole (e.g., prior to packetization into individual CAN frames), or the payload of each individual CAN frame, which collectively representing a single CAN message, may be encrypted. Because it may affect operation of the CAN, other fields of a CAN frame, such as the CAN identifier, may be left unencrypted.

In an embodiment, hacking detection system 170 for a particular ECU 134 may decrypt any CAN message that was encrypted by another hacking detection system 170 on another ECU 134. The decryption of CAN messages may be performed using any known decryption mechanism that corresponds to the encryption mechanism that was used to encrypt the CAN message. For example, a private key may be used to encrypt the message, and a public key may be used to decrypt the message. Alternatively, a public key may be used to encrypt the message, and a private key may be used to decrypt the message.

As discussed above, each hacking detection system 170 knows which CAN identifiers are associated with valid and trusted sources and which are associated with invalid or untrusted sources. Accordingly, prior to decryption, a hacking detection system 170 may determine whether or not the CAN message was received from a trusted source. If so, hacking detection system 170 may then decrypt the CAN message. Otherwise, hacking detection system 170 may determine not to decrypt the CAN message or frame. In other words, in an embodiment, hacking detection system 170 only decrypts a CAN message when it is received from a trusted source, i.e., an ECU 134 which is associated with another hacking detection system 170. For example, hacking detection system 170A may decrypt a CAN message from ECU 134B since it has hacking detection system 170B, but not ECU 134E since it does not have a hacking detection system 170.

In addition, the ability to decrypt the message, using the appropriate decryption method (e.g., using the appropriate key), can serve as validation of the source, since an invalid source would generally not be able to encrypt the message in a manner that corresponds to the decryption method (e.g., since an invalid source would not have the appropriate encryption key). Thus, if hacking detection system 170 is unable to successfully decrypt an encrypted CAN message (e.g., because an invalid key was used for encryption), hacking detection system 170 may determine that it is not from a valid source and/or may represent malicious activity. In addition, if hacking detection system 170 is expecting encryption for CAN messages with a particular CAN identifier, but received an unencrypted CAN message with that CAN identifier, hacking detection system 170 may determine that the CAN message is not from a valid source and/or may represent malicious activity.

Figure 6A:
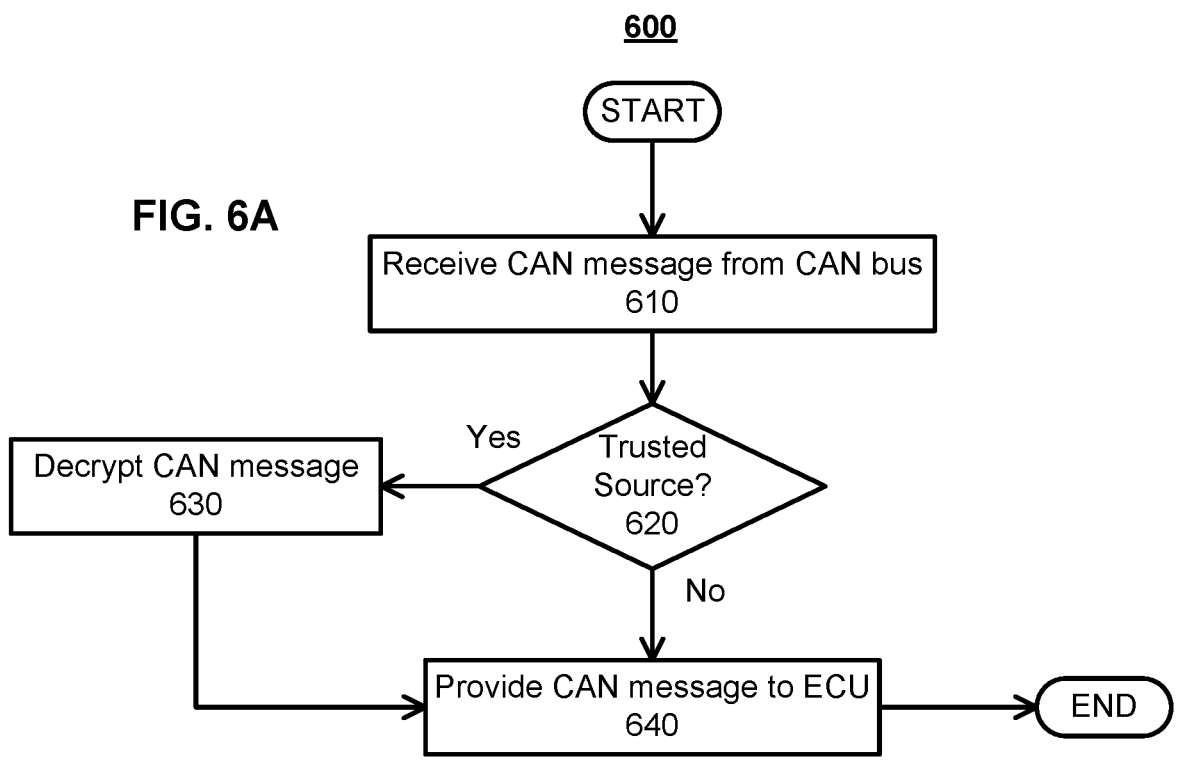
FIG. 6A illustrates a process for decrypting CAN messages, according to an embodiment.

FIG. 6A illustrates a process 600 for decrypting CAN messages, according to an embodiment. Process 600 may be implemented by a hacking detection system 170 monitoring each CAN message received by its associated ECU 134 via CAN bus 132. To aid in understanding, it will be assumed that hacking detection system 170A on ECU 134A is implementing process 600 to monitor received CAN messages.

In step 610, hacking detection system 170A receives a CAN message that has been received by the associated ECU 134A on CAN bus 132. Hacking detection system 170A then determines, in step 620, whether the source of the CAN message is a trusted source. As discussed elsewhere herein, step 620 may comprise comparing the CAN identifier in the CAN message to a list of CAN identifiers, associated with ECUs 134 covered by hacking detection systems 170, in a local data store of hacking detection system 170A. If the CAN identifier in the CAN message is found in the list, hacking detection system 170A may determine that the source of the CAN message is a trusted source (i.e., "Yes" in step 620). Otherwise, if the CAN identifier in the CAN message is not found in the list, hacking detection system 170A may determine that the source of the CAN message is not a trusted source (i.e., "No" in step 620). For example, if the CAN message is from ECU 134B, hacking detection system 170A determines that the CAN message is from a trusted source (i.e., "Yes" in step 620). On the other hand, if the CAN message from ECU 134E, hacking detection system 170A determines that the CAN message is not from a trusted source (i.e., "No" in step 620).

If hacking detection system 170A determines that the source is a trusted source (i.e., "Yes" in step 620), hacking detection system 170A decrypts the CAN message in step 630. Otherwise, if hacking detection system 170A does not determine that the source is a trusted source (i.e., "No" in step 620), hacking detection system 170 does not decrypt the CAN message. In either case, in step 640, the CAN message, whether decrypted in step 630 or not, is provided to the associated ECU 134A (e.g., to microcontroller 164 or CAN controller 168), which may or may not further process the CAN message.

Figure 6B:
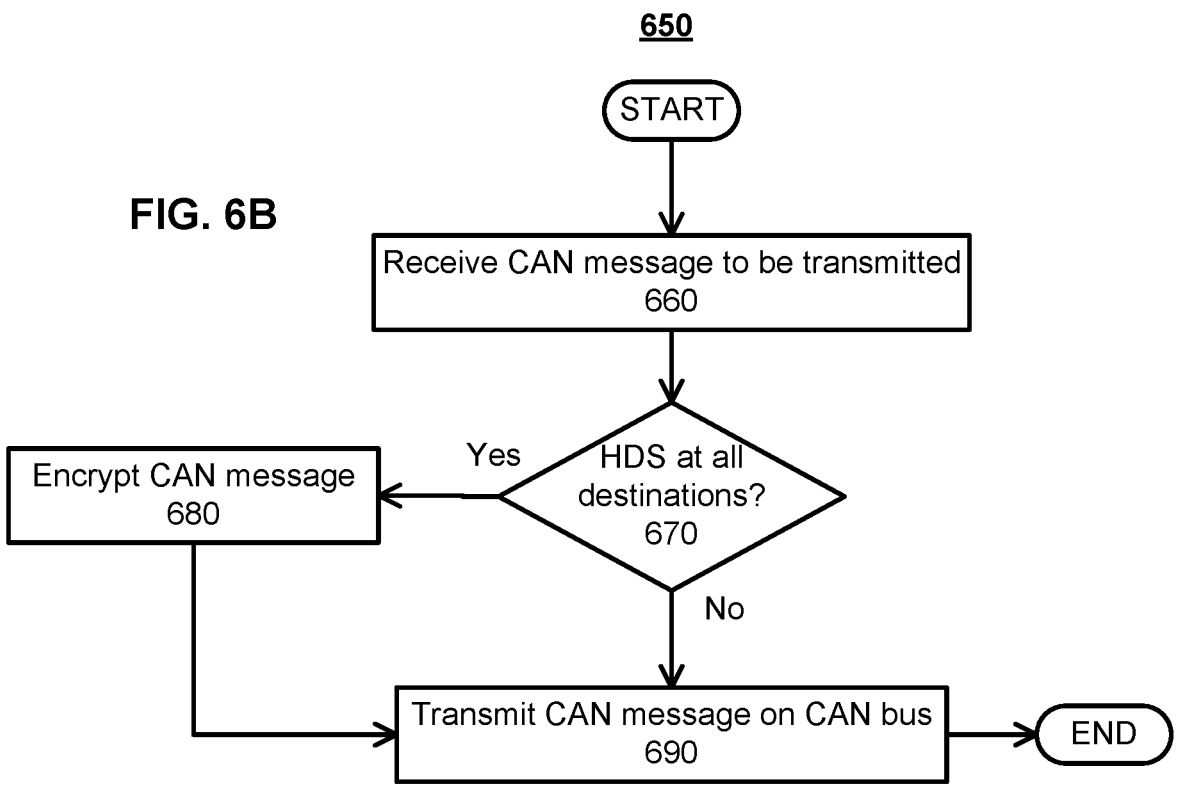
FIG. 6B illustrates a process for encrypting CAN messages, according to an embodiment.

FIG. 6B illustrates a process 650 for encrypting CAN messages, according to an embodiment. Process 650 may be implemented by a hacking detection system 170 monitoring each CAN message to be transmitted by its associated ECU 134 via CAN bus 132. Process 650 is essentially the reverse of process 600. Again, to aid in understanding, it will be assumed that hacking detection system 170A on ECU 134A is implementing process 650 to monitor CAN messages to be transmitted.

In step 660, hacking detection system 170A receives a CAN message that is to be transmitted by the associated ECU 134A on CAN bus 132. Hacking detection system 170A then determines, in step 670, whether all intended destinations of the CAN message are ECUs 134 that have associated hacking detections systems 170. As in step 620, step 670 may comprise comparing the CAN identifiers of the intended recipients or some other identifier (e.g., peer identifier) of the intended recipients to a list of identifiers. If all of the intended recipients are identified in the list, hacking detection system 170A determines that all destinations are covered by a hacking detection system 170 (i.e., "Yes" in step 570). Otherwise, if at least one intended recipient is not identified in the list, hacking detection system 170A determines that not all destinations are covered by a hacking detection system 170 (i.e., "No" in step 670). For example, if the intended recipients consist of ECUs 134B and 134C, hacking detection system 170A determines that all intended recipients are protected by a hacking detection system 170 (i.e., "Yes" in step 670). On the other hand, if the intended recipients consist of ECUs 134B and 134E, hacking detection system 170A determines that not all intended recipients are protected by a hacking detection system 170 (i.e., "No" in step 670), since ECU 134E is not protected by any hacking detection system 170.

If hacking detection system 170A determines that all destinations are covered by a hacking detection system 170 (i.e., "Yes" in step 670), hacking detection system 170 encrypts the CAN message in step 680. Otherwise, if hacking detection system 170A does not determine that all destinations are covered by a hacking detection system 170 (i.e., "No" in step 670), hacking detection system 170 does not encrypt the CAN message. In either case, in step 690, the CAN message, whether encrypted in step 680 or not, is provided to the associated ECU 134A (e.g., to microcontroller 164 or CAN controller 166) for transmission on CAN bus 132.

2.3.4. Pattern Detection

Hacking detection system 170 may be configured to learn patterns within the CAN, and identify departures from those patterns that may represent malicious activity. Specifically, hacking detection system 170 may monitor all CAN traffic, at its associated ECU node 134, to classify and discover properties of each type of CAN message on CAN bus 132. These properties may include, without limitation, whether or not a type of CAN message is cyclical, the cycle time of a cyclical type of CAN message, how a particular field (e.g., payload, counter field, CRC field, etc.) in each type of CAN message is used, the event or events that trigger each type of CAN message, and/or the like. A "type" of CAN message may refer to the CAN messages having the same CAN identifier or having the same source (i.e., being transmitted by the same ECU 134).

The behavioral patterns may be learned during the initial learning stage, described elsewhere herein, and updated over time. In an embodiment, machine learning is used to build a machine-learning model. In this case the initial learning stage may represent the training phase for a machine-learning algorithm. After the training phase, the machine-learning algorithm may be used by hacking detection system 170 to identify an expected behavioral pattern in the CAN based on current parameters of the CAN. If actual behavior in the CAN departs from this expected behavioral pattern, hacking detection system 170 may determine that there is a possibility of malicious activity. Alternatively or additionally, the machine-learning algorithm may be trained using a data set that represents malicious activity. In this case, if the actual behavior in the CAN follows a behavioral pattern expected by the machine-learning algorithm, hacking detection system 170 may determine that there is a possibility of malicious activity. The parameters used for the machine-learning algorithm or any other pattern-detection technique may include, without limitation, the states of sensors, external conditions, the behaviors (e.g., message cycles, types of messages, etc.) of ECUs 134, the states (e.g., active or inactive) of ECUs 134, attributes of message payloads, CRC fields, and/or counter fields, resource usage (e.g., memory usage, processor usage, etc.), and/or the like.

Hacking detection system 170 may store the monitored behavior(s) and/or the pattern-detection mechanism (e.g., rules, machine-learning model, etc.) built from the monitored behavior(s), for its associated ECU 134, in persistent, non-volatile memory, such as memory 162 of the associated ECU 134. In the event that the monitored behavior(s) are stored in non-volatile memory, they can be used to for crash analysis (e.g., following a failure of the associated ECU 134) or other analytics related to the associated ECU 134, as discussed elsewhere herein.

The states of sensors (e.g., tire pressure, temperature, surround image, etc.) can be identified using machine learning to correlate the states of sensors with the CAN identifier and payload of CAN messages. Thus, based on the CAN identifier and payload of CAN messages, hacking detection system 170 may be able to determine the states of one or more sensors (e.g., within other system(s) 140) within the vehicle. Whatever pattern-detection mechanism is used may be trained to correlate these determined sensor states with expected and/or malicious behavioral patterns. For instance, current determined sensor states may be input as parameters (e.g., with other parameters) to a machine-learning model, built using machine learning on training values of the sensor states, to produce a probability that these sensor states (e.g., in conjunction with the other parameters) are representative of malicious activity. As an example, if a tire-pressure sensor provides tire pressure values every 50 milliseconds (ms) that are consistently around 34 pounds per square inch (psi), but suddenly provides a tire pressure value of 5 psi, hacking detection system 170 may determine that this represents an invalid sensor value, since tire pressure cannot drop from 34 psi to 5 psi within 50 ms.

External conditions may include any metric that is external to the CAN. Examples of external conditions include, without limitation, temperature, road condition, precipitation, humidity, wind speed and/or direction, and/or the like. CAN traffic may vary based on these external conditions. For example, the types and/or frequencies of CAN messages being sent by ECUs 134 when the vehicle is in a high-temperature environment may be different than the types and/or frequencies of CAN messages being sent by ECUS 134 when the vehicle is in a low-temperature environment (e.g., snowy conditions). There may also be a difference in electrical patterns on CAN bus 132, depending on the external conditions (e.g., temperature, humidity, etc.). Thus, whatever pattern-detection technique is used may be trained to correlate one or more external condition(s) with expected and/or malicious behavioral patterns. For instance, one or more current external conditions may be input as parameters with other parameters to a machine-learning model, built using machine learning on training values of the external conditions, to produce a probability that these other parameters, in the context of the current external conditions, are representative of malicious activity. As an example, the pattern-detection mechanism may expect a different behavioral pattern for the CAN when the external conditions are cold and snowy than when the external conditions are hot and humid.

In an embodiment, hacking detection system 170 learns the cycles in which particular CAN identifiers are received, and may determine that a departure from that cycle represents potential malicious activity. For instance, hacking detection system 170A of ECU 134A may determine that ECU 134B transmits CAN messages cyclically based on the CAN identifier used by ECU 134B appearing on CAN bus 132 in a certain cycle. For purposes of illustration, it will be assumed that the cycle is sixty seconds, i.e., a CAN message with the CAN identifier is received after every sixty-second interval. Thus, hacking detection system 170A may store an indication that the CAN identifier of ECU 134B was seen at time T (seconds). Hacking detection system 170A would expect the next CAN message with that CAN identifier to be received at T+60±Δt, where Δt represents an allowable variation. If hacking detection system 170A receives a CAN message with the same CAN identifier at time T+30, hacking detection system 170A may determine that the CAN message represents potential malicious activity. If hacking detection system 170A does not receive any CAN message with the same CAN identifier by T+60±Δt, hacking detection system 170A may determine that the ECU 134 associated with that CAN identifier is in a bus-off state, as described elsewhere herein.

In some cases, an ECU 134 may transmit a cyclical CAN message, but on different cycles depending on the current state of the ECU 134. For example, in an active state, the ECU 134 may transmit on a shorter cycle, and, in an inactive state, the ECU 134 may transmit on a longer cycle. Hacking detection system 170 can learn these cycles for each cyclically received CAN identifier, and use the learned cycles to identify the state of a particular ECU 134. For purposes of illustration, it will be assumed that ECU 134B transmits in a cycle of ten seconds in the active state and sixty seconds in the inactive state. Hacking detection system 170A may learn that ECU 134B sometimes transmits according to a first cycle by observing CAN messages, having its CAN identifier, received at regular intervals of ten seconds. Hacking detection system 170A may also learn that ECU 134B sometimes transmits according to a second cycle by observing CAN messages, having the same CAN identifier, received at regular intervals of sixty seconds. Under the assumption that an inactive ECU 134 will transmit less frequently than an active ECU 134, hacking detection system 170A may determine that the first cycle corresponds to ECU 134B's active state, and the second cycle corresponds to ECU 134B's inactive state. Accordingly, while monitoring CAN messages received at ECU 134A, if hacking detection system 170A detects that CAN messages with ECU 134B's CAN identifier are being received at intervals corresponding to the first cycle, hacking detection system 170A may determine that ECU 134B is in the active state. Conversely, if hacking detection system 170A detects that CAN messages with ECU 134B's CAN identifier are being received at intervals corresponding to the second cycle, hacking detection system 170A may determine that ECU 134B is in the inactive state.

Alternatively, hacking detection system 170A can determine that ECU 134B is in the inactive state by looking at the payload of the CAN messages received from ECU 134B. Specifically, if the payload, excluding counter and CRC fields, is not changing, hacking detection system 170A can determine that ECU 134B is inactive. Otherwise, hacking detection system 170A can determine that ECU 134B is active.

In either case, hacking detection system 170 may use its knowledge of whether an ECU 134 is in the active or inactive state to detect possible malicious activity. For example, hacking detection system 170A may know when to expect a cyclical message from the ECU (e.g., according to a first cycle or a second cycle), based on whether it is active or inactive, and determine that a departure from the relevant cycle may represent malicious activity. Hacking detection system 170A may expect a certain behavioral pattern when the ECU 134B is active and a different behavioral pattern when the ECU 134B is inactive, and identify when departures from the expected relevant behavioral pattern may represent malicious activity.

In an embodiment, in addition to monitoring the behaviors of other ECUs 134, each hacking detection system 170 may monitor the behaviors of its associated ECU 134. Such behaviors may include process usage (e.g., which software processes are currently executing on microcontroller 164, which processes spawn a particular process, which processes access which areas of memory 162, patterns of inter-process communications, behavior of user apps, etc.), memory access (e.g., which addresses are being read from or written to in memory 162, the amount of memory 162 being used, the rate at which memory 162 is being used and/or accessed, which areas of memory are read-only, the pattern of read-write access, etc.), and/or network access (e.g., whether or not an external-communication interface and/or CAN bus 132 is being used, which external-communication interfaces are being used, the rate at which an external-communication interface and/or CAN bus 132 is being used, an amount, characteristic, and/or type of data being transmitted and/or received via an external-communication interface and/or CAN bus 132, the source and/or destination of data being received and/or transmitted via an external-communication interface, average time of network connections, etc.). In an ECU 134, which has one or more external-communication interfaces, hacking detection system 170 may monitor which processes communicate using the external-communication interface(s) and the type of data being communicated using the external-communication interface(s). Certain patterns within outgoing external communications (e.g., processes involved in the transmissions, frequency, data amounts, data types, etc.) may be indicative of data theft. For example, if the data amount of an upload exceeds the usual pattern (e.g., learned during the initial learning stage), hacking detection system 170 may determine that a potential data theft is occurring and take appropriate action. In addition, certain modifications of memory 162, the spawning of certain processes, and/or the like may indicate malicious activity, and therefore, can be detected by hacking detection system 170. In general, the monitored behaviors may be used to build a baseline behavioral pattern, to which subsequent behaviors are compared. Whatever pattern-detection mechanism is used may be trained to correlate one or more of the aforementioned behaviors with expected and/or malicious behavioral patterns. For instance, current behaviors may be input as parameters to a model, built using machine learning on training values of the behaviors, to produce a probability that these current behaviors are representative of malicious activity.

Figure 7:
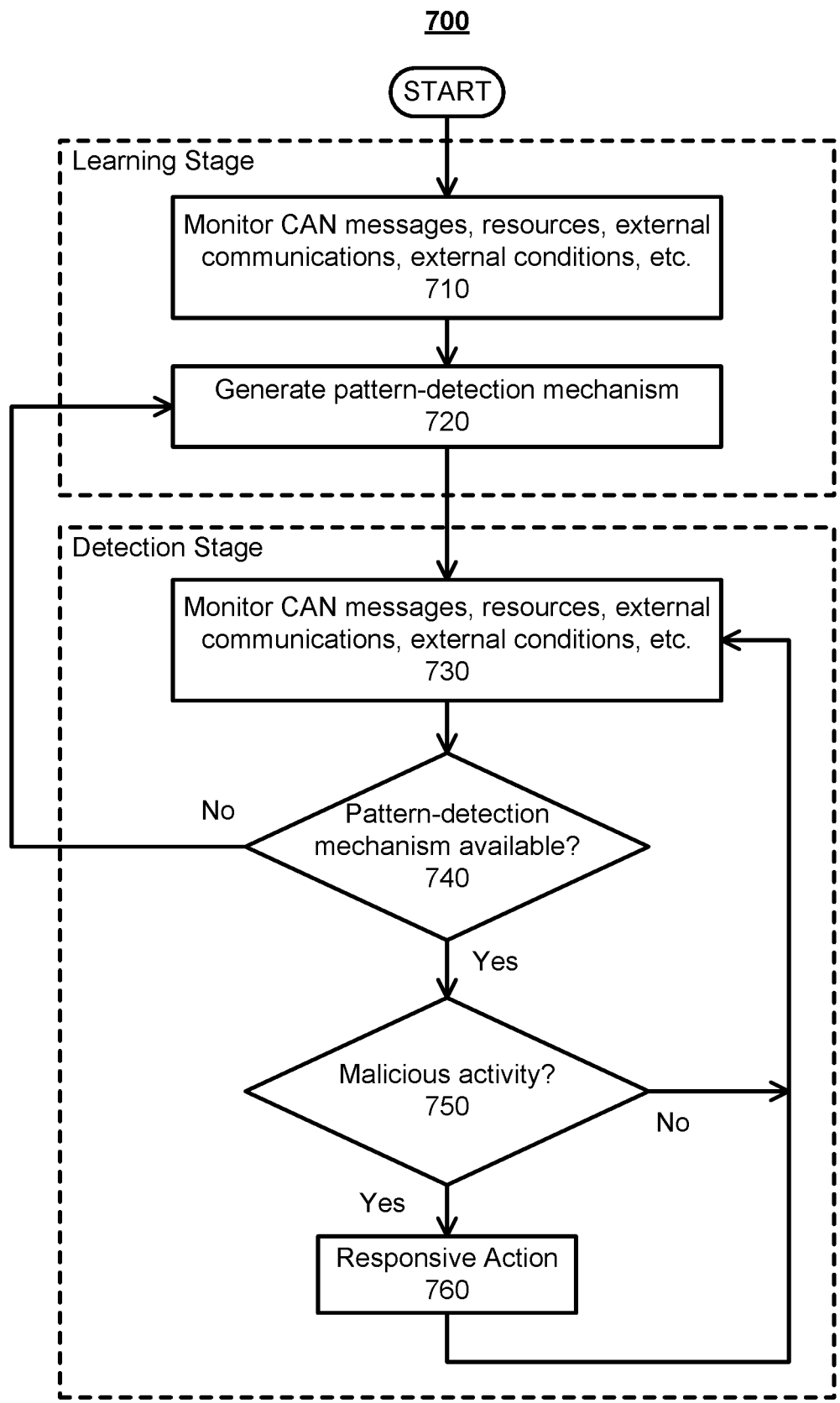
FIG. 7 illustrates a process for pattern detection, according to an embodiment.

FIG. 7 illustrates a process 700 for pattern detection, according to an embodiment. Process 700 may be implemented by a hacking detection system 170. As shown, process 700 has a learning stage (comprising steps 710 and 720), in which patterns are learned, and a detection stage (comprising steps 730-760), in which patterns are detected.

In step 710 of the learning stage, hacking detection system 170 monitors CAN messages, resources, external communications, external conditions, and/or other data. In an embodiment, hacking detection system 170 may monitor the data for only its associated ECU 134. Alternatively, hacking detection system 170 may monitor the data for all hacking detection systems 170 in its sub-network 310 and/or hacking detection network 300. As discussed elsewhere herein, all of the hacking detection systems 170 in a sub-network 310 or across the entire hacking detection network 300 may share their data with each other, such that all hacking detection systems 170 within a sub-network 310 or hacking detection network 300 have the same data. In some implementations, each hacking detection system 170 may monitor the data for only its associated ECU 134, except that a master hacking detection system 170, in each sub-network 310 or for the entire hacking detection network 300, may collect all of the data from all of the hacking detection systems 170 within its domain. Each hacking detection system 170 may store all of the monitored data in its local data store, for example, in non-volatile memory (e.g., memory 162).

In an embodiment, the monitored and stored data may comprise, without limitation, one or more (e.g., all or any combination) of the following:

(1) All CAN messages received and/or transmitted by the associated ECU 134. For each CAN message that is monitored, hacking detection system 170 may store the time at which the CAN message was received or transmitted, a payload of the CAN message, a process that utilized or transmitted the CAN message, and/or the like. In addition, hacking detection system 170 may store diagnostic messages transmitted by the associated ECU 134, sleep patterns of the associated ECU 134 (e.g., times at which the associated ECU 134 enters a sleep or inactive mode), states of the associated ECU 134 and/or other devices (e.g., sensors) at the time each CAN message is received or transmitted, external conditions at the time each CAN message is received or transmitted, and/or the like.

(2) One or more characteristics of the CAN messages received by the associated ECU 134, including, without limitation:

(a) Cyclical or Fixed Periodic. One characteristic is the cyclicality of a type of CAN message. In an embodiment, hacking detection system 170 may calculate the time differences between each received CAN message of the same type (e.g., each received CAN message comprising the same CAN identifier). In the event that each time difference between CAN messages of the same type is within a first predetermined threshold (e.g., two thousand milliseconds) and the time differences between two consecutive CAN messages of the same type do not vary by more than a second predetermined threshold or percentage (e.g., 25%), hacking detection system 170 may determine that CAN messages of that type are cyclical, and store this characteristic in association with an indication of the type of CAN message (e.g., the CAN identifier used by that type of CAN messages) in the local data store. The time difference between that type of CAN message may also be stored in the local data store as the cycle time, and the maximum variation between the time differences (e.g., a few milliseconds) may be stored in the local data store as the cycle time variation for that type of CAN message. Notably, a single type of CAN message may have two or more cycles, for example, one for when the ECU 134, which is transmitting the CAN message, is active, and one for when that ECU 134 is inactive. In this case, the cycle times and cycle time variations for all of the cycles may be stored in association with a status indicator (e.g., of active or inactive, under the assumption that an ECU 134 that is active will have a shorter cycle time, and an ECU 134 that is inactive will have a longer cycle time).

(b) Event Periodic. The transmission of a CAN message may also be triggered by the occurrence of an event detected by the transmitting ECU 134. An ECU 134 which transmits event-periodic messages may also transmit fixed-periodic messages. In this case, the event-periodic messages may be transmitted near the boundaries of each cycle, as well as one or multiple times within the intervals between cycles. Accordingly, hacking detection system 170 may determine whether or not an ECU 134 transmits event-periodic CAN messages, and, if so, store an indication that the ECU 134 transmits event-periodic CAN messages in the local data store.

(c) Enabled Periodic. An ECU 134 may also transmit enabled-periodic messages. This refers to when an ECU 134 transmits CAN messages in a temporary cycle following the occurrence of an event. Hacking detection system 170 may detect the temporary cycle in the same manner as described above with respect to the fixed-periodic messages, and store an indication that the ECU 134 transmits enabled-periodic CAN messages, along with the cycle time, and the cycle time variation in the local data store. In addition, hacking detection system 170 may determine the number of cycles in which the enabled-periodic CAN messages are transmitted, and store this number in the local data store as well. For example, hacking detection system 170 may determine that the cycles have ended when the time since the last enabled-periodic CAN message was received exceeds the maximum time difference (optionally with some predetermined time tolerance added) between preceding enabled-periodic CAN messages.

(3) One or more characteristics of the payload of CAN messages received by the associated ECU 134. In an embodiment, hacking detection system 170 may compare each CAN message, within a cycle, to each other at nibble level (e.g., bit level). For some types of CAN messages, the CRC field (e.g., four bytes) periodically changes with the change of one or more bits in the payload of the CAN message. In an embodiment, hacking detection system 170 may also compare the payload field of each CAN message, within a cycle, to the payload field of the immediately preceding CAN message within the cycle, at nibble level. Some payloads comprise a counter field. If hacking detection system 170 determines that the difference in the same portion (e.g., four consecutive bits) of the payload field between consecutive CAN messages is always one, hacking detection system 170 can determine that that portion of the payload field is a counter, and store a representation of this characteristic in the local data store in association with that type of CAN message.

(4) Inbound and/or outbound communications between the associated ECU 134 and an external network via an external-communication interface integral to or utilized by the associated ECU 134. For example, hacking detection system may store data about all inbound and/or outbound connections, inbound and/or outbound data rates, amount of data downloaded and/or uploaded via external communications, identities of processes that are utilizing the inbound and/or outbound communications, the protocols being used for the external communications, the payload of the external communications, one or more characteristics (e.g., metrics) of the payload of the external communications, the external endpoints of the external communications, and/or the like.

(5) One or more characteristics of resource access (e.g., access of memory 162, including memory buffers and/or flash memory) in the associated ECU 134, including, without limitation, which areas of memory 162 are being read and/or written, the read rate, the write rate, read-only areas in memory 162, rate of changes in memory 162, most frequently accessed areas in memory 162, area(s) of memory 162 that are only accessed during booting of the associated ECU 134, the sequence or other patterns in which memory areas are accessed and/or files are stored, and/or the like.

(6) Process activity in the associated ECU 134, including, without limitation, which processes are performing which operations, the identities of processes that are reading and/or writing to memory 162 and which areas in memory 162 they are reading from and/or writing to, the identities of processes that are communicating via CAN bus 134 and/or an external-communication interface, which processes spawn which new processes, the behavior of the process responsible for firmware updates (e.g., FOTA) during a firmware update, the behavior of executing user apps, the identity of any newly installed user app, and/or the like.

(7) One or more external conditions, including, without limitation, temperature, humidity, wind speed, and/or wind direction outside the vehicle, road conditions (e.g., wet, icy, snowy, slippery, etc.), other weather, and/or the like.

(8) Values of one or more sensors.

In step 720, hacking detection system 170 generates a mechanism for detecting the patterns observed in the data collected in step 710. Step 720 may comprise generating a set of rules, conditions, or criteria that, when applied to new data, result in a determination of normal and/or malicious activity. For example, a simple rule might be that, if a CAN message is received with a CAN identifier and that CAN identifier is currently associated in the local data store with an indication that its associated ECU 134 is in a bus-off state, then an impersonation attack is occurring. Another example of a rule is one in which, if the amount of data being transmitted in an external communication to an external endpoint exceeds a certain threshold or a certain percentage above the average amount of data seen during the learning stage, then data theft is occurring.

Additionally or alternatively, step 720 may comprise training a machine-learning model to recognize patterns of normal and/or malicious behavior from combinations of certain parameters (e.g., sensor values, external conditions, characteristics of CAN messages, memory access, network access, and/or any of the other types of monitored data described herein) in the data. This may comprise weighting more predictive parameters higher than less predictive parameters.

Each pattern-detection mechanism learns one or more patterns in all or a subset of the monitored and stored data, so that it can recognize that pattern and/or a departure from that pattern in the future. For example, the pattern-detection mechanism may learn, during the learning stage, that the payload for a certain type of periodic CAN message changes whenever a particular sensor gets activated. Accordingly, if, during the detection stage, the particular sensors gets activated but the payload for that type of periodic CAN message does not change in the usual manner, hacking detection system 170 may detect this as possible malicious activity.

In an embodiment, each pattern-detection mechanism that is generated by a hacking detection system 170 is stored in a persistent, non-volatile local data store of the hacking detection system 170 (e.g., in memory 162 of ECU 134). Thus, whenever the hacking detection system 170 is rebooted, it can simply reload the stored pattern-detection mechanisms, instead of having to undergo a distinct learning stage.

In step 730 of the detection stage, hacking detection system 170 monitors CAN messages, resources, external communications, external conditions, and/or other data. This step may be identical to step 710. Thus, any description of step 710 applies equally to step 730, and therefore, a redundant description is omitted. It should be understood that steps 710 and 730 may be a single ongoing process that is performed continuously and in parallel with the other steps in process 700, instead of distinct steps.

In step 740, hacking detection system 170 determines whether or not a pattern-detection mechanism is available for the set of data collected in step 730. If a pattern detection mechanism is not available (i.e., "No" in step 740), hacking detection system 170 may return to step 720 to generate a new pattern-detection mechanism for the set of data collected in step 730 or update an existing pattern-detection mechanism using the set of data collected in step 730. On the other hand, if a pattern-detection mechanism is available (i.e., "Yes" in step 740), hacking detection system 170 selects the pattern-detection mechanism and proceeds to step

750. It should be understood that a plurality of different pattern-detection mechanisms may be generated in step 720, and that one or more relevant ones of those plurality of pattern-detection mechanisms may be selected in step 740. The pattern-detection mechanism used may depend on the set of data being analyzed. For example, if the set of data comprises external communications, the selected pattern-detection mechanism may comprise functionality to analyze the external communications at a deep protocol level (e.g., using a module configured to analyze cellular, IP, Bluetooth™, Wi-Fi™, and/or other messages) in conjunction, for example, with activities of the process that is utilizing or attempting to utilize the external communications.

In step 750, hacking detection system 170 applies the pattern-detection mechanism, selected in step 740, to the set of data, collected in step 730, to detect any malicious activity. For example, in the case that the pattern-detection mechanism comprises one or more rules, the rules may be applied to the set of data to identify a pattern representing malicious activity and/or a departure from normal activity (e.g., departure from a baseline pattern). In the case that the pattern-detection mechanism comprises a machine-learning model, the set of data or relevant parameters from the set of data may be input to the model, and the model may output the probability that the input parameters represent one or more malicious activities and/or departures from normal activity (e.g., departure from a baseline pattern). In this case, if the probability of a malicious activity exceeds a certain threshold, hacking detection system 170 may determine that the malicious activity has been detected. The malicious activity may comprise a communication (e.g., CAN message or external message to an external endpoint), an operation (e.g., on or by an ECU 134), a memory access (e.g., of memory 162 on an ECU 134), the execution or spawning of a process (e.g., by microcontroller 164 or other processor 210 on an ECU 134), and/or the like.

The following are illustrative, non-limiting examples of scenarios in which a pattern-detection mechanism may detect malicious activity:

(1) If a process, executing on the associated ECU 134, which never previously performed external communications, attempts to make an outbound connection using an external-communication interface or spawns a new process to make the outbound connection, this attempt may be detected as potential data theft.

(2) If a process, executing on the associated ECU 134, has performed external communications before, but attempts to make an outbound connection to an external endpoint to which it never previously connected, this attempt may be detected as potential data theft.

(3) if the amount and/or rate of outbound data transfer exceeds a maximum or average of the learned normal amount and/or rate, by a certain threshold or percentage (e.g., representing a higher than normal amount and/or rate), this may be detected as potential data theft.

(4) If the amount and/or rate of inbound data transfer exceeds a maximum or average of the learned normal amount and/or rate, by a certain threshold or percentage, this may be detected as the potential download of malware.

(5) If a process, which never previously read and/or wrote to memory 162 and/or a particular area of memory 162, attempts to read and/or write to memory 162 and/or the particular area of memory 162, this attempt may be detected as potential malicious activity.

(6) If a process, executing on the associated ECU 134, which never previously deleted a file, attempts to delete a file, this attempt may be detected as potential malicious activity.

(7) If a process, executing on the associated ECU 134, which never previously created a file, attempts to create a new file, this attempt may be detected as the potential installation of malware.

(8) If a process, executing on the associated ECU 134, which never previously spawned a process or a particular process, attempts to spawn a process or that particular process, this attempt may be detected as potential malicious activity.

(9) If a process, executing on the associated ECU 134, which never previously performed inter-process communication, attempts to perform inter-process communication, this attempt may be detected as potential malicious activity.

(10) If a process, executing on the associated ECU 134, which never previously performed a particular operation, attempts to perform that particular operation, this attempt may be detected as potential malicious activity.

(11) If a process, executing on the associated ECU 134, which never previously transmitted a CAN or diagnostic message on CAN bus 132, attempts to transmit a CAN or diagnostic message on CAN bus 132, this attempt may be detected as potential malicious activity.

(12) If an in-memory buffer or particular area of memory 162 is being accessed more frequently and/or less frequently than normal (e.g., not at all), this may be detected as potential malicious activity.

(13) If a pattern of messages within a sub-network 310 suggests that the sub-network 310 is in a critical state, this may be treated in the same manner as malicious activity.

As long as no malicious activity is detected (i.e., "No" in step 750), hacking detection system continues to monitor the data without taking any exceptional action. Otherwise, if malicious activity is detected (i.e., "Yes" in step 750), hacking detection system may take appropriate responsive action in step 760. For example, in step 760, hacking detection system 170 may generate an alert and/or actively seek to mitigate the malicious activity. Active mitigation may comprise discarding CAN messages and/or external communications that represent or support the malicious activity, closing network connections with external endpoints that may be stealing data, blocking or killing processes that represent or are performing the malicious activity, preventing inter-process communications by a particular process, preventing memory accesses (e.g., reads and/or writes) that represent or support the malicious activity, preventing or disallowing any operation that represents or supports the malicious activity, and/or the like.

2.3.5. Vehicle Routing

In some instances, hacking detection system 170 may be associated with an ECU 134 that has one or more external-communication interfaces configured to communicate with one or more external networks or devices. An external-communication interface may provide wireless communication via standard wireless communication technologies (e.g., cellular, Wi-Fi™, Bluetooth™, etc.). This provides the opportunity for proximity-based attacks by devices within a physical proximity of the vehicle (e.g., within a range of communication distance provided by the exploited wireless communication technology). Possible attack vectors include Bluetooth™ connectivity provided by the vehicle, Bluetooth™ connectivity provided by the user's mobile device (e.g., connected to the vehicle), radio frequency identification (RFID) connectivity, the vehicle's connection to a vehicle-to-vehicle network, and/or the like.

Hacking detection system 170 may monitor communications traversing the external-communication interface(s) of its associated ECU 134 to identify insecure communication paths as possible attack vectors. Hacking detection system 170 may then monitor these possible attack vectors to detect the presence of a proximity-based attack. In an embodiment, proximity-based attacks may be detected using any of the pattern-detection mechanisms described herein, such as a set of one or more rules or a machine-learning model applied to the external communications, resource usage, and/or the like. For example, if hacking detection system 170 determines that an external-communication interface is downloading an abnormally large amount of data from a previously unseen external endpoint, while vehicle 160 is traveling, hacking detection system 170 may determine that a proximity-based attack is occurring.

When hacking detection system 170 detects a proximity-based attack, hacking detection system 170 can assume that the attacking device is within close proximity of the vehicle. For instance, hacking detection system 170 may assume that the attacking device is within a radial distance from the vehicle that is equal to the radial range of the particular wireless communication technology of the attack vector. Thus, if the attack vector is Wi-Fi™, hacking detection system 170 may determine that the attacking device is within a first radial distance corresponding to the wireless range of Wi-Fi™, whereas, if the attack vector is Bluetooth™, hacking detection system 170 may determine that the attacking device is within a second radial distance corresponding to the wireless range of Bluetooth™. Since Bluetooth™ generally has a shorter range than Wi-Fi™, it should be understood that the second radial distance will be shorter than the first radial distance in this example.

Hacking detection system 170 may communicate information about the detected proximity-based attack to a navigation module, which may be comprised in a server 112 on platform 110 (e.g., in which case the information is communicated via network(s) 120) or another system 140 of the vehicle. The information may comprise a location (e.g., GPS coordinates received from a GPS receiver of other systems 140) at which the proximity-based attack was detected, the radial distance for the attack vector and/or an indication of the attack vector from which the radial distance may be derived, and/or the like. This information may then be used by the navigation module to determine an approximate geographic area that is vulnerable to the proximity-based attack. A representation of this vulnerable geographic area (e.g., GPS coordinates and radius) may then be stored in persistent memory (e.g., in database(s) 114 by server 112, in secondary memory 220 accessible to an on-board navigation module, etc.). Each vulnerable geographic area represents a location at which a proximity-based attack has been previously witnessed and for which it is assumed that a future proximity-based attack may occur. It should be understood that a plurality of such representations may be stored over time, as proximity-based attacks are encountered. In the event that the navigation module is comprised in server 112 or an on-board navigation module receives such information via a vehicle-to-vehicle network, the plurality of representations may be derived from information provided by a plurality of vehicles 160.

Subsequently, whenever the navigation module generates a vehicular route between a starting and destination point, it may take the stored representations of vulnerable geographic areas into account. For example, the vehicular route may be generated to avoid (e.g., route around) the vulnerable geographic areas. This may be a user-specifiable option that can be implemented similarly to how current navigation systems allow users to route around toll roads. Advantageously, routing around vulnerable geographic areas reduces the risk that vehicles will be exposed to proximity-based attacks. In other words, the navigation module may generate a route that is secure from cyber-attacks.

In an embodiment, a vulnerable geographic account is only used to alter a vehicular route if at least a predefined number of proximity-based attacks are detected by a plurality of different hacking detection systems 170 and/or across a predefined time period. For example, a threshold may be defined as a certain number of proximity-based attacks, a certain number of different vehicles 160 that detected at least one proximity-based attack, a certain number of proximity-based attacks over a certain time period, and/or the like, including combinations of these metrics. Regardless of the particular metric used, if the metric for a particular geographic area exceeds the threshold, the navigation module may then begin attempting to route around that geographic area. Otherwise, the navigation module may continue keeping track of the metric for the geographic area, but refrain from attempting to route around the geographic area until and unless the metric exceeds the threshold.

In an embodiment, navigation module may evaluate the risk of a particular route based on the vulnerable geographic areas along that route. For example, a risk rating, for each of a plurality of alternate routes between the starting and destination points, may be computed based on factors that include, without limitation, the number of vehicles 160 which experienced proximity-based attacks along the route, the time of day that the route is to be traveled and/or the proximity-based attacks occurred, the specific make and/or model of the vehicle 160 that is to travel along the route and the specific make and/or models of vehicles 160 which experienced proximity-based attacks along the route, the attack vector(s) of the proximity-based attacks that were experienced along the route and/or the wireless communication technologies available in the vehicle that is to travel along the route, and/or the like. The navigation module may avoid providing routes with high risk ratings. For example, the navigation module may calculate alternative routes and select the route with the lowest risk rating, or the fastest route (e.g., in terms of time and/or distance) with a risk rating below a predefined threshold. Alternatively, other mechanisms may be used to appropriately balance the objective of selecting a route with a low risk rating with the objective of minimizing the time and/or distance required for a vehicle to traverse the route.

In an embodiment in which the navigation module is comprised in server 112 on platform 110, platform 110 may provide an API to the functionality of the navigation module. For example, the API may define subroutines by which an external system may retrieve definitions of vulnerable geographic areas, routes between particular starting and destination locations which minimize a risk rating, and/or the like. Thus, an external system (e.g., which generates and/or displays a navigational graphical user interface (GUI)) may utilize the data collected by the navigation module and/or routes generated by the navigation module to provide navigational instructions to a user (e.g., via a display in a vehicle or on a user's mobile device or personal computer).

2.3.6. Acknowledgement Messages

As discussed elsewhere herein, whenever a recessive ACK bit is detected in the CAN frame that an ECU 134 is transmitting, that ECU 134 must retransmit the CAN frame, since the CAN frame was not successfully received by any other ECU 134 on CAN bus 132. On the other hand, when a dominant bit is detected and no subsequent error frame is received, the ECU 134 assumes that no retransmission is required. However, it is possible for a hacker or hacked ECU 134 to generate a denial-of-service (DOS) attack by setting a recessive ACK bit in a well-crafted acknowledgement message, to thereby trigger retransmissions.

In an embodiment, hacking detection system 170 on its respective ECU 134 may learn the number of ECUs 134 that use messages transmitted by its respective ECU 134. For example, during the initial learning stage, described herein, each hacking detection system 170 may transmit (e.g., in the introduction message or other message within the hacking-detection message protocol) a list of CAN identifiers to which its respective ECU 134 listens. Thus, hacking detection system may count the number of ECUs 134 that listen to each CAN identifier transmitted by its respective ECU 134.

Then, when an ECU 134 transmits a CAN message, its respective hacking detection system 170 may count the number of acknowledgement messages received, and identify potential malicious activity by comparing this number of acknowledgement messages to the number of listening ECUs 134. For example, if the number of acknowledgement messages exceeds the number of listening ECUs 134, the hacking detection system 170 may determine that there is a malicious actor on CAN bus 132, transmitting malicious acknowledgement messages. In this case, hacking detection system 170 may prohibit its respective ECU 134 from retransmitting the CAN message, so as to nullify the attempted DOS attack. For example, hacking detection system 170 may instruct its respective ECU 134 to ignore the malicious acknowledgement message (i.e., the acknowledgement message with a recessive ACK bit) for at least a predetermined time period. Additionally or alternatively, the hacking detection system 170 may generate an alert to report the DOS attack.

In an embodiment, if a hacking detection system 170 determines that malicious acknowledgement messages are arriving frequently (e.g., at a predefined rate), but all ECUs 134 transmitting those acknowledgement messages are protected by a hacking detection system 170, the hacking detection system 170 may transmit a verification message, according to the hacking-detection message protocol, to determine whether or not there was an actual issue with its last transmitted CAN message. Each hacking detection system 170 may maintain an ACK error flag, and may respond to the verification message by indicating the state of its ACK error flag. To ensure message reliability, both the verification message and the responses may be encrypted as discussed elsewhere herein.

2.3.7. Analytics

As discussed elsewhere herein, all or a subset of the data monitored by hacking detection systems 170 may be stored in their respective local data stores. Each hacking detection system 170 may maintain a rolling window of the most recently collected data, such that older data is deleted from the local data store as new data is collected. The rolling window may be defined in terms of time or amount of data. For example, hacking detection system 170 may always maintain the most recent twenty-four hours' worth of the data, and delete data older than twenty-four hours. It should be understood that twenty-four hours is simply one example of a time-based window, and that other shorter or longer time windows may be used instead. As another example, hacking detection system 170 may always maintain the most recent N gigabytes of memory. The particular time or data window used may be selected based on the size of memory 162, the memory needs of the associated ECU 134, and/or any other consideration.

In an embodiment, the data stored in the local data stores of one or more hacking detection systems 170 may be periodically uploaded, over network(s) 120, to a server 112 on platform 110 for remote storage. In the case that a rolling window is used, all data that is about to exit the rolling window or which has exited the rolling window may be uploaded to server 112 prior to deletion. This ensures that all of the data, collected by hacking detection systems 170, is preserved at server 112. In this case, the data may be analyzed at server 112 to produce analytical information about crashes, cyber-attacks, and/or the like. For example, upon the occurrence of a crash or cyber-attack, server 112 may correlate events, represented within the data (e.g., across a plurality of hacking detection systems 170 and ECUs 134), to identify the root cause of a crash or cyber-attack, the origin of a cyber-attack, the flow of a cyber-attack, and/or the like. Such information can then be used to improve hacking detection systems 170, ECUs 134, vehicle systems 130, other systems 140, and/or the like.

In an embodiment, the data stored in the local data stores of one or more hacking detection systems 170 may be periodically transmitted and stored within a "black box" in vehicle 160. Much like a flight recorder, the black box may comprise a damage resistant housing and internal components that are designed to survive most vehicular accidents. One of these components may be a non-transitory computer-readable storage medium (e.g., solid state drive or other form of flash memory) designed to store and protect the data transmitted by hacking detection systems 170. Similarly to hacking detection systems 170, the black box may store a rolling window of the data, and delete or overwrite stale data in order to ensure that a rolling window of the most recent data is always stored on the storage medium. Thus, following a vehicular accident, the data in the storage medium, protected by the black box, may be analyzed to determine the cause of the vehicular accident.

2.4. Response to Malicious Activity

If a hacking detection system 170 encounters any operation within an ECU 134 or on the CAN that is detected as malicious activity, the hacking detection system 170 may prohibit the operation. For example, whenever a hacking detection system 170 determines a malicious message is entering CAN bus 132 (e.g., via gateway ECU), it may drop the malicious message so that it never makes its way onto CAN bus 132. As another example, whenever a hacking detection system 170 identifies a malicious message on CAN bus 132, it may prevent or mitigate any damage. For instance, the hacking detection system 170 may prevent its associated ECU 134 from processing or otherwise acting on the malicious message. As additional examples, the hacking detection system 170 may prohibit access to particular resources (e.g., memory 162, microcontroller 164, etc.) representing or supporting malicious activity, kill processes that are suspected of malicious activity, prohibit inbound and/or outbound external communications that represent or support malicious activity, and/or the like.

In an embodiment, whenever a hacking detection system 170 determines the possibility of malicious activity or one or more types of malicious activity, it triggers an alert. For example, the alert may comprise transmitting an emergency message to all ECUs 134 on the CAN to notify each ECU 134 of the malicious activity. In the event that the malicious activity is the impersonation of a particular ECU 134, the emergency message may comprise the CAN identifier or other identifier used by the impersonated ECU 134.

In an embodiment, for one or more types of malicious activity, the alert may comprise displaying or otherwise providing a notification to a user (e.g., a driver or passenger in the vehicle). For example, hacking detection system 170 may trigger vehicle system 130 to communicate with other system(s) 140 to provide the notification. In the event that the other system(s) 140 comprise a HUD, instrument cluster, dashboard, steering wheel, and/or the like, the notification may comprise a visual alert (e.g., blinking light, flashing icon, warning message, etc.) within the HUD, instrument cluster, dashboard, steering wheel, and/or the like. Alternatively or additionally, the notification may comprise an audio alert via the vehicle's primary audio system or other audio system (e.g., a speaker within the dashboard, steering wheel, etc.). Alternatively or additionally, the notification may comprise a haptic alert (e.g., by vibrating a haptic motor within the steering wheel of the vehicle, such that the steering wheel delivers a gentle vibration to the driver's hands).

The notification to the user (e.g., driver) may inform, caution, or warn the user about the malicious activity (e.g., that a cyber-attack was attempted or is occurring). In addition, the notification may provide the user with details about the malicious activity and/or for mitigating the malicious activity. For example, these details may describe the malicious activity and/or comprise instructions for proactively ending any threat, posed by the malicious activity, to the vehicle or user.

In an embodiment, for one or more types of malicious activity, the alert may comprise prohibiting the vehicle from starting or shutting down the vehicle. For example, when the malicious activity is indicative of vehicle theft, the hacking detection system 170 may initiate a theft prevention system (e.g., one of other system(s) 140), which immobilizes the vehicle.

2.5. Theft Prevention

In an embodiment, a user may intentionally immobilize a vehicle to prevent theft. For example, server 112 may implement or support a web application that maintains an immobilization flag. A user (e.g., driver) may register a vehicle with a user account on server 112. Once registered, server 112 may maintain an immobilization flag with each user's registered vehicles. The user's account may be protected by standard security measures, in order to prevent unauthorized changes to the immobilization flag.

A user may then utilize a website and/or a client app on their mobile device or other computing device to post a request to server 112 to either set or unset the immobilization flag associated with any registered vehicle. In addition, each registered vehicle may communicate with server 112 (e.g., using standard protocols via cellular or other wireless technology) to determine whether or not its associated immobilization flag is set or unset. For example, an ECU 134, responsible for ignition (e.g., the engine ECU), or a hacking detection system 170 on the ECU 134 responsible for ignition, may perform the communication and/or determination. If the associated immobilization flag is not set (i.e., the flag comprises a value representing that the vehicle is not immobilized), the ECU 134 or hacking detection system 170 will allow the vehicle to start normally in response to the appropriate start operation (e.g., turning a key, pressing a start button while a key fob is within the vehicle, operating a start input on a mobile app, etc.). On the other hand, if the associated immobilization flag is set (i.e., the flag comprises a value representing that the vehicle is immobilized), the ECU 134 or hacking detection system 170 will prevent the vehicle from starting, even if an appropriate operation is used to start the vehicle. In addition, the ECU 134 or hacking detection system 170 may initiate an alert, which may be relayed through server 112, to the user's device (e.g., to notify a client app on the user's device to provide a visual, audio, and/or haptic alert to the user). Alternatively or additionally, the alert may comprise triggering an alarm system of the vehicle (e.g., to emit an audio alert from the vehicle, blink lights on the vehicle, etc.).

2.6. Firmware Updates

In an embodiment, firmware updates (e.g., to an ECU 134) may be performed over the air using a network of update nodes, which are connected in a trust relationship. Each update node may be implemented as a server 112 at a different node within network(s) 120. Each update node may be associated with a unique node identifier, and store a complete image of the firmware update to be deployed, as well as any associated metadata (e.g., keys for encryption and/or decryption). In other words, each update node may be functionally identical to each other update node, and maintain synchronization with all other update nodes within the trust network.

Each image of the firmware update may be divided into a plurality of discrete blocks. Each block may comprise a portion of the firmware update (e.g., as binary data) and be associated with metadata comprising the unique node identifier on which the block is stored, a block identifier (e.g., a sequence identifier indicating the block's position within the complete image of the firmware update), the block identifier of a preceding block, the block identifier of the next block, a key for encrypting the block, a key for decrypting the block, and/or the like. Each of the plurality of blocks may be encrypted with an encryption key (e.g., private key) associated with that block.

In an embodiment, the encryption keys may be associated on a per-block basis, such that each block uses the same encryption key across all server nodes. Alternatively, encryption keys may be associated on a per-node basis, such that all blocks on a first node are all encrypted using a first encryption key, whereas all blocks on a second node are all encrypted using a second encryption key that is different than the first encryption key. As another alternative, encryption keys may be associated on a per-block and per-node basis, such that every block across all server nodes is encrypted using a different encryption key. As yet another alternative, the blocks may be encrypted on a per-vehicle basis, such that each block being transmitted to a first vehicle is encrypted using a first encryption key, regardless of which server node is transmitting the block, whereas each block being transmitted to a second, different vehicle is encrypted using a second encryption key that is different than the first encryption key.

Figure 8:
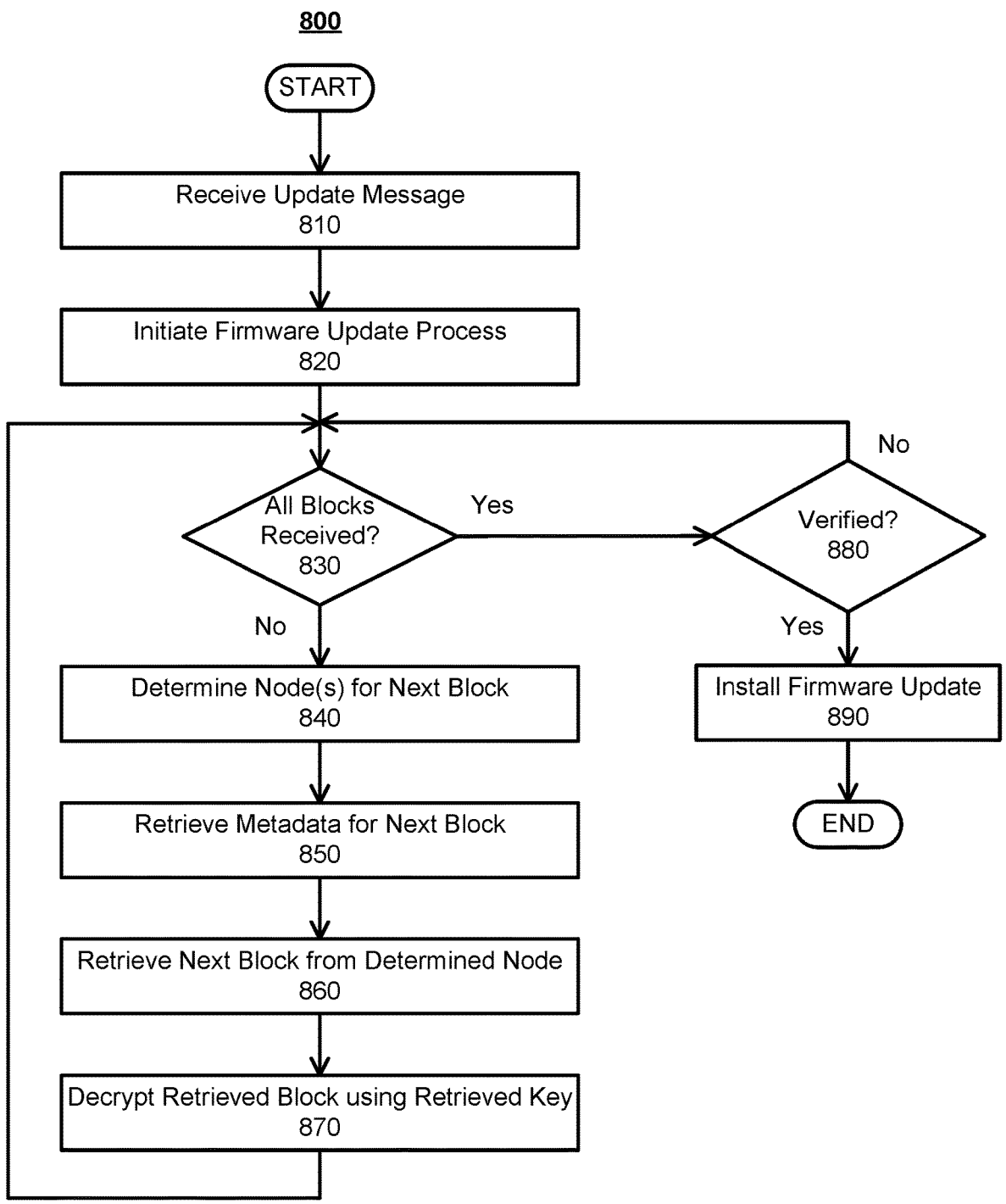
FIG. 8 illustrates a firmware-over-the-air (FOTA) process, according to an embodiment.

FIG. 8 illustrates a firmware-over-the-air (FOTA) process 800, according to an embodiment. Process 800 may be implemented by vehicle system 130, an ECU 134, a system 150, and/or any other target system within a vehicle that manages firmware updates within the vehicle.

Process 800 is initiated when an update message is received in step 810. For example, an OEM may trigger one of the update nodes (e.g., a server 112) to transmit a message to the target system within the vehicle to notify the target system that a firmware update is required or available for the target system. The notification may comprise the block identifier of the first block of the firmware update. In response, the target system may initiate the firmware update process in step 820.

In an embodiment, when the firmware update process is started by a target system, a session token (e.g., a randomly generated string) may be generated for that target system's firmware update process and shared with all the update nodes within the trust network. The session token may be used to identify and track the firmware update process across multiple update nodes. Thus, the session token may be used to ensure that no target system retrieves two consecutive blocks from the same update node. The session token may expire once the target system has successfully collected all blocks of the firmware update.

In step 830, the target system determines whether all of the blocks, collectively representing the full firmware update, have been received. If at least one block remains to be received (i.e., "No" in step 830), the target system proceeds to step 840. Otherwise, if all blocks have been received (i.e., "Yes" in step 830), the target system proceeds to step 880.

In step 840, the target system determines from which update node or nodes to retrieve the metadata for the next block of firmware data, as well as the next block itself. For the first block and/or the metadata for the first block, the target system may select any update node. In an embodiment, the target system is required to retrieve the next block from a different update node than the update node from which the immediately preceding block was retrieved. In the most secure implementation, the target system may be required to retrieve each block from a different update node than any other block. Additionally or alternatively, the target system may be required to retrieve the metadata for the next block from a different update node than the next block itself. These requirements reduce the danger of a hacker impersonating an update node, since the hacker would need to impersonate multiple update nodes.

Alternatively, the target system may retrieve the block and the metadata from the same update node. As another alternative, the target system may be permitted to retrieve multiple blocks from the same update node, but optionally may be prevented from retrieving two or more consecutive blocks from the same update node. For example, the target system could identify a subset of the closest update nodes (e.g., closest in terms of geographic and/or network proximity), and retrieve blocks and/or metadata using a round-robin technique, random selection (e.g., but preventing consecutive selection of the same update node), and/or any other technique that guarantees that multiple update nodes will be used over the entire firmware update process.

In an embodiment, the subset of update nodes, from which a target system may select the update node from which to retrieve the next block and/or metadata, may change as the vehicle moves. For example, the target system may simply select or be biased to select the closest update node, and the selected update node will naturally change as the vehicle, comprising the target system, travels.

In step 850, the target system retrieves the metadata for the next block from the update node determined in step 840, for example, via network(s) 120. The retrieved metadata may comprise a decryption key (e.g., public key) for decrypting the next block to be retrieved. The metadata itself may be encrypted using an encryption key (e.g., private key) associated with the OEM of the target system. Each of the OEM's vehicle-installed target systems or the vehicle as a whole may store a decryption key (e.g., public key) that can be used to decrypt the metadata, for example, in order to obtain the decryption key for the block.

In step 860, the target system retrieves the next block from the update node determined in step 840, for example, via network(s) 120. For example, the metadata, retrieved in step 850 may comprise the block identifier for the next block. The target system may provide this block identifier in a block request transmitted to the update node. The update node may retrieve the block associated with the provided block identifier, and return the retrieved block to the target system. The target system may also verify that the block, retrieved in step 860, was received correctly (e.g., using a CRC field and/or metadata retrieved in step 850).

As discussed previously, the update node from which the block is retrieved in step 860 may be different than the update node from which the metadata for that block was retrieved in step 850. In addition, in an embodiment, the metadata and/or block may be retrieved indirectly, in step 850 and/or 860, from the respective update node via another infrastructure component. For example, a secure and trusted network of infrastructure devices (e.g., a traffic light or other fixture within a traffic system, another vehicle within a vehicle-to-vehicle network, etc.) may be used to communicate firmware blocks and metadata to the target system. All communications in steps 850 and 860 may utilize secure, encrypted channels (e.g., Transport Layer Security (TLS)).

In step 870, the target system may decrypt the block, retrieved in step 860, using the decryption key in the metadata, retrieved in step 850. Alternatively, the target system could wait until all blocks have been received before decrypting the blocks. In either case, process 800 returns to step 830, to retrieve the next block or complete the firmware update.

In step 880, prior to assembly and installation of the firmware update, the firmware update process is verified by the trust network. For example, the retrieval history for the target system may be stored by the verifying entity (e.g., the first update node which pushed the update message received in step 810, the last update node from which a block was retrieved, another update node, a central server of the trust network, etc.) in association with the session token for the particular target system's firmware update process. The verifying entity (e.g., in response to a request from the target system) may traverse the retrieval history for the session to confirm that all blocks were requested and/or verify with each update node that the blocks were actually retrieved by the target system. If the verifying entity verifies that all blocks were successfully retrieved, the verifying entity may transmit a completion message to the target system, and expire (e.g., delete) the session token. On the other hand, if the verifying entity does not verify that all blocks were successfully retrieved, the verifying entity may cancel and/or restart the firmware update process for the target system by transmitting a cancellation message to the target system. After cancellation of the firmware update process, the verifying entity may clean up information about the cancelled firmware update process within the trust network (e.g., deleting the retrieval history and/or session token).

If the target system receives the completion message from the verifying entity (i.e., "Yes" in step 880), the target system proceeds to step 890. Otherwise, if the target system receives the cancellation message from the verifying entity (i.e., "No" in step 880), the target system may return to step 830 to retrieve any blocks that were not previously successfully retrieved. Alternatively, the target system could return to step 820 to restart the entire firmware update process, or await a new update message in another iteration of step 810.

In step 890, once the firmware update process has been verified, the target system may assemble the retrieved blocks into the complete firmware update, and apply the firmware update to the firmware. Thus, process 800 provides a secure FOTA mechanism, for deploying firmware updates to a plurality of vehicles, that minimizes the potential for malware injection.

2.7. Licensing

In an embodiment, usage of hacking detection system 170 is managed via licenses. In such an embodiment, hacking detection systems 170 will only work when associated with a valid license. In addition, a particular ECU 134 may be configured to remain inoperative until activated by a license. An OEM may install hacking detection system 170 into the ECUs 134 which it manufactures, and purchase a license for activation of each installed hacking detection system 170. Alternatively, the vehicle manufacturer could install hacking detection system 170 into all or some ECUs 134 of its vehicle, and purchase license(s) for activation of the installed hacking detection systems 170.

Licenses could be issued on a per-vehicle basis (e.g., a lifetime license per vehicle 160). In this case, a license may be limited to a maximum number of devices (e.g., ECUs 134) per vehicle 160. Alternatively, licenses could be issued on a per-use basis, which is limited to a certain amount of time (e.g., the amount of time the protected ECU 134 is operating, the amount of time the licensed hacking detection system 170 is operating, the amount of time the vehicle is running, etc.) and/or certain mileage of the vehicle.

Figure 9:
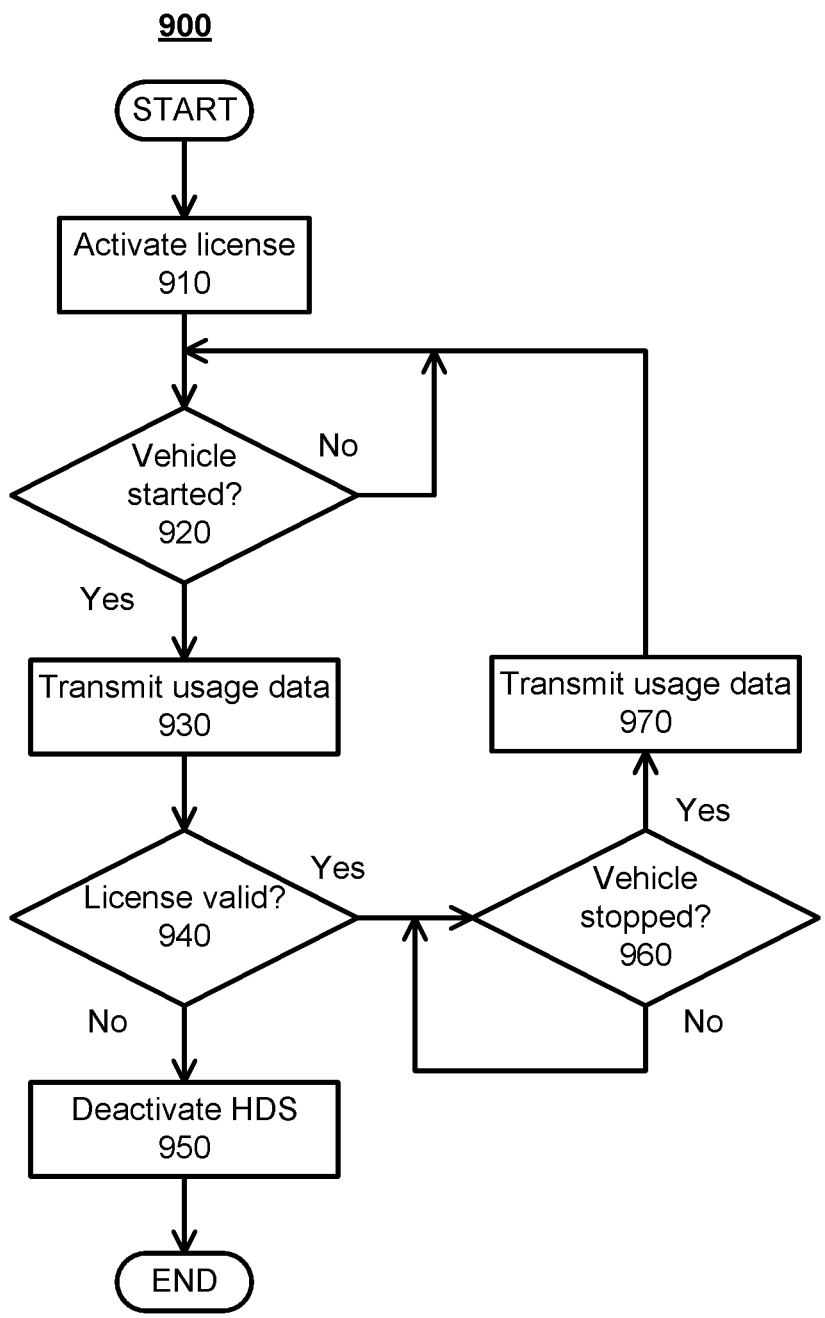
FIG. 9 illustrates a process for managing the license for one or more hacking detection systems installed with ECU(s) of a vehicle, according to an embodiment.

FIG. 9 illustrates a process 900 for managing the license for one or more hacking detection systems 170 installed within ECU(s) 134 of a vehicle 160, according to an embodiment. In step 910, the license is activated. For example, as discussed above, the license for hacking detection system(s) 170 may be activated by the OEM or vehicle manufacturer after production of the ECU(s) 134 or vehicle 160.

In an embodiment, when vehicle 160 is produced, a reporting device (e.g., the ECU 134 attempting to activate its hacking detection system 170, vehicle system 130 attempting to activate the hacking detection systems 170 of all ECUs 134, another system 140, etc.) of vehicle 160 may communicate with a license server 112 on platform 110 (e.g., over network(s) 120 via an external-communication interface). Specifically, the reporting device may transmit a request to license server 112 comprising identifying information, such as the vehicle identification number (VIN) of vehicle 160, an identifier of ECU(s) 134 for which a hacking detection system 170 is to be activated, a Media Access Control (MAC) address of these ECU(s) 134, and/or the like. License server 112 may then associate a license with the identifying information and return the license to the reporting device (e.g., over network(s) 120 via an external-communication interface). This license may be stored in a non-volatile memory of the reporting device.

Then, whenever the vehicle is started in step 920 (i.e., "Yes" in step 920), the reporting device transmits usage data in step 930 and checks the validity of the license in step 940. Notably, while step 930 is shown as being performed before step 940, in the alternative, step 930 may be performed after step 940 or in parallel with step 940.

In step 930, the reporting device may transmit accumulated usage data to license server 112 (e.g., over network(s) 120 via an external-communication interface). The usage data may comprise, without limitation, total running time of the vehicle and/or hacking detection system 170, total mileage of the vehicle, up-time of the reporting device and/or ECUs 134, and/or the like. In an embodiment, license server 112 monitors the usage data for licensed hacking detection systems 170 to prevent misuse.

In step 940, the reporting device may verify the validity of the license stored in the non-volatile memory of the reporting device. Step 940 may comprise transmitting a request to license server 112 to confirm the validity of the license, and receiving a response from license server 112 that either confirms the validity of the license or denies validity of the license. Alternatively, logic for validating the license may be provided in the firmware of the reporting device. In this case, the reporting device may confirm the validity of the license using this internal logic (e.g., by comparing stored requirements of the license to the collected usage data), without having to communicate with license server 112.

The validity of a license may be governed by a licensing strategy. For example, as discussed above, a license may be issued on a per-vehicle basis, on a per-use basis, and/or the like. In the case of a per-use license, the usage data may be used (e.g., by license server 112, in the case that the validity determination is made by license server 112) to determine whether or not the license has expired. In an embodiment, a grace period may be provided after expiration of the license. During this time, the license may continue to be adjudicated as valid in step 940, but an alert may be provided, for example, via another system 140 (e.g., by displaying a message within a display in the vehicle), via license server 112 (e.g., by sending an email or text to the user associated with the vehicle, sending a notification to a client app associated with the user of the vehicle to be displayed to the user, etc.), and/or the like.

If the license is determined to be valid (or expired but within the grace period) (i.e., "Yes" in step 940), the hacking detection system 170 associated with the license continues to operate as normal. Otherwise, if the license is determined to be invalid (i.e., "No" in step 940), the reporting device may deactivate the hacking detection system 170 associated with the license. Deactivation may comprise prohibiting loading and execution of the hacking detection system 170 associated with the invalid license, uninstalling the hacking detection system 170 associated with the invalid license, blocking alerts provided by the hacking detection system 170 associated with the invalid license, and/or the like.

Whenever the vehicle is stopped in step 960 (i.e., "Yes" in step 960), the reporting device transmits usage data in step 970. Step 960 may be similar or identical to step 930, and therefore, any description of step 930 applies equally to step 960, and therefore, a redundant description is omitted.

As illustrated with respect to process 900, a reporting device within a vehicle (e.g., an ECU 134 with an external-communication interface) may communicate with a license server 112 upon the triggers of starting and stopping of the vehicle in steps 930 and 970, respectively. Alternatively, the triggers may comprise only one of starting and stopping the vehicle, in which case step 930 or step 970 may be omitted. Additionally or alternatively, triggers, other than starting or stopping the vehicle, may be used. For example, the trigger for transmitting the usage data may comprise starting of a hacking detection system 170, the starting of an ECU 134, the amount of accumulated usage data exceeding a threshold, the availability of a connection to license server 112 (e.g., if communication is performed via Wi-Fi™ or Bluetooth™, which may only be intermittently available), and/or the like. As yet another alternative or addition, the usage data may be transmitted periodically (e.g., at the expiration of regular intervals). In any of these cases, the usage data, which may be the same as described with respect to steps 930 and 970, may be accumulated until the transmission of the usage data occurs. After transmission of the usage data, the usage data, stored in the reporting device, may be deleted or overwritten.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   from each of a plurality of vehicles, receive a location of a proximity-based attack to at least one electronic control unit (ECU) of the vehicle, wherein the location of a proximity-based attack comprises a geographic location at which the proximity-based attack was detected by a hacking detection system of the vehicle;
   store each received location of a proximity-based attack in a memory;
   receive a navigation request from at least one user device over at least one network, wherein the navigation request identifies a starting location and a destination location for a vehicular journey; and,
   in response to the navigation request,
      identify at least one vehicular route between the starting location and the destination location that minimizes a risk of proximity-based attack based on the stored locations of proximity-based attacks, and
      transmit a representation of the at least one vehicular route to the at least one user device over the at least one network.

2. The method of claim 1, wherein identifying the at least one route comprises:
   generating a plurality of routes between the starting location and the destination location;
   for each of the plurality of routes, generating a score based on the stored locations of proximity-based attacks that coincide with the route and one or both of a distance and estimated time of the route; and
   identifying one of the plurality of routes with a most favorable score as the at least one vehicular route.

3. The method of claim 2, wherein the score is generated further based on one or more factors.

4. The method of claim 3, wherein the one or more factors comprise one or more of:
   a number of vehicles which experienced the proximity-based attack at each stored location;
   a time of day that the route is to be traveled;
   a time of day that the proximity-based attack occurred;
   a make of a vehicle associated with the at least one user device;
   a model of the vehicle associated with the at least one user device;
   a wireless communication technology available in the vehicle associated with the at least one user device; or
   an attack vector of the proximity-based attack.

5. The method of claim 1, wherein the proximity-based attack comprises an exploitation of a wireless communication interface within at least one of the one or more vehicles.

6. The method of claim 5, wherein the wireless communication interface is a cellular interface.

7. The method of claim 5, wherein the wireless communication interface is a Wi-Fi interface.

8. The method of claim 5, wherein the wireless communication interface is a Bluetooth interface.

9. The method of claim 5, further comprising, by the hacking detection system within each of the plurality of vehicles, monitoring communications traversing the wireless communication interface to identify insecure communication paths as possible attack vectors.

10. The method of claim 9, further comprising, by the hacking detection system within each of the plurality of vehicles, monitoring the possible attack vectors to detect a presence of the proximity-based attack.

11. The method of claim 10, wherein monitoring the possible attack vectors comprises applying a set of one or more rules or a machine-learning model to external communications via the wireless communication interface.

12. The method of claim 10, wherein monitoring the possible attack vectors comprises applying a set of one or more rules or a machine-learning model to resource usage.

13. The method of claim 1, wherein the location of the proximity-based attack comprises the geographic location at which the proximity-based attack was detected and a radial distance for an attack vector of the proximity-based attack.

14. The method of claim 1, wherein the location of the proximity-based attack comprises the geographic location at which the proximity-based attack was detected and an indication of an attack vector of the proximity-based attack.

15. The method of claim 1, further comprising using the at least one hardware processor to, for each received location of a proximity-based attack, determine an approximate geographic area that is vulnerable to that proximity-based attack based on the geographic location at which that proximity-based attack was detected and a radial distance for an attack vector of that proximity-based attack.

16. The method of claim 15, wherein minimizing the risk of proximity-based attack comprises avoiding the approximate geographic area when the proximity-based attack satisfies a metric.

17. The method of claim 16, wherein the metric comprises one or more of a number of occurrences of the proximity-based attack that are detected, or a number of different vehicles that detected an occurrence of the proximity-based attack.

18. The method of claim 1, further comprising using the at least one hardware processor to provide an application programming interface that comprises functionality for retrieving one or both of definitions of vulnerable geographic areas associated with the stored locations, or routes between starting and destination locations that minimize a risk of proximity-based attack.

19. A system comprising:
- at least one hardware processor;
- memory; and
- one or more software modules that, when executed by the at least one hardware processor,
    - from each of a plurality of vehicles, receive a location of a proximity-based attack to at least one electronic control unit (ECU) of the vehicle, wherein the location of a proximity-based attack comprises a geographic location at which the proximity-based attack was detected by a hacking detection system of the vehicle,
    - store each received location in the memory,
    - receive a navigation request from at least one user device over at least one network, wherein the navigation request identifies an starting location and a destination location for a vehicular journey, and,
    - in response to the navigation request,
        - identify at least one vehicular route between the starting location and the destination location that minimizes a risk of proximity-based attack based on the stored locations, and
        - transmit a representation of the at least one vehicular route to the at least one user device over the at least one network.

20. A non-transitory computer-readable medium having instructions stored therein, wherein the instructions, when executed by a processor, cause the processor to:
- from each of a plurality of vehicles, receive a location of a proximity-based attack to at least one electronic control unit (ECU) of the vehicle, wherein the location of a proximity-based attack comprises a geographic location at which the proximity-based attack was detected by a hacking detection system of the vehicle;
- store each received location of a proximity-based attack in a memory;
- receive a navigation request from at least one user device over at least one network, wherein the navigation request identifies an starting location and a destination location for a vehicular journey; and,
- in response to the navigation request,
    - identify at least one vehicular route between the starting location and the destination location that minimizes a risk of proximity-based attack based on the stored locations of proximity-based attacks, and
    - transmit a representation of the at least one vehicular route to the at least one user device over the at least one network.

* * * * *